United States Patent
Wang et al.

(10) Patent No.: US 9,645,951 B1
(45) Date of Patent: May 9, 2017

(54) ACCELERATOR SYSTEM FOR REMOTE DATA STORAGE

(71) Applicant: DRC Computer Corporation, Santa Clara, CA (US)

(72) Inventors: Michael H. Wang, Hillsborough, CA (US); Steven Mark Casselman, Santa Clara, CA (US); Babu Rao Kandimalla, San Jose, CA (US); Stephen Paul Sample, Saratoga, CA (US); Lawrence A. Laurich, Sunnyvale, CA (US)

(73) Assignee: DRC Computer Corporation, Santa Clara, CA (US)

( * ) Notice: Subject to any disclaimer, the term of this patent is extended or adjusted under 35 U.S.C. 154(b) by 286 days.

(21) Appl. No.: 14/339,834

(22) Filed: Jul. 24, 2014

Related U.S. Application Data

(62) Division of application No. 13/117,821, filed on May 27, 2011, now Pat. No. 8,824,492.

(60) Provisional application No. 61/349,560, filed on May 28, 2010.

(51) Int. Cl.
| | |
|---|---|
| *H04L 12/28* | (2006.01) |
| *G06F 13/10* | (2006.01) |
| *G06F 3/06* | (2006.01) |
| *H04J 1/16* | (2006.01) |

(52) U.S. Cl.
CPC .......... *G06F 13/102* (2013.01); *G06F 3/061* (2013.01); *G06F 3/067* (2013.01); *G06F 3/0659* (2013.01)

(58) Field of Classification Search
USPC ................. 370/252, 278, 389, 386
See application file for complete search history.

(56) References Cited

U.S. PATENT DOCUMENTS

| | | | |
|---|---|---|---|
| 6,434,620 B1 * | 8/2002 | Boucher | H04L 12/5693 709/230 |
| 2008/0189794 A1 * | 8/2008 | Staring | G06F 21/10 726/27 |
| 2011/0219208 A1 * | 9/2011 | Asaad | G06F 15/76 712/12 |

* cited by examiner

*Primary Examiner* — John Pezzlo
(74) *Attorney, Agent, or Firm* — The Webostad Firm, A Professional Corporation

(57) ABSTRACT

Data processing and an accelerator system therefor are described. An embodiment relates generally to a data processing system. In such an embodiment, a bus and an accelerator are coupled to one another. The accelerator has an application function block. The application function block is to process data to provide processed data to storage. A network interface is coupled to obtain the processed data from the storage for transmission.

20 Claims, 24 Drawing Sheets

ACCELERATOR SYSTEM FOR REMOTE DATA STORAGE

CROSS-REFERENCE TO RELATED APPLICATIONS

This is a divisional application of U.S. nonprovisional patent application Ser. No. 13/117,821, filed May 27, 2011, which claims benefit to U.S. provisional patent application No. 61/349,560, entitled "Hardware Accelerator with Networking Capability", filed May 28, 2010, each of which is incorporated herein by reference in its entirety for all purposes.

FIELD

One or more embodiments generally relate to data processing and, more particularly, to an accelerator system for data processing for remote data storage or other networking application.

BACKGROUND

Standard microprocessors may not include circuitry for performing some algorithms. By using a Field Programmable Gate Array ("FPGA") for example to provide an accelerator system, an algorithm can be programmed into hardware to build a circuit for an algorithm, resulting in significant acceleration in the execution of such algorithm. However, even with an accelerator system, data transactions associated with such algorithms are often handled by system resources, such as system memory, a central processing unit ("CPU"), a Southbridge, or a Northbridge (collectively and singly "motherboard system resources").

Furthermore, data may be stored remotely from such motherboard system resources, using computing and storage resources that may be coupled to such motherboard system resources over a network. Such computing and storage resources may be referred to as "cloud computing" resources, and such remote storage of data is sometimes referred to as "cloud storage." However, data handling via a network interface coupled to motherboard system resources may burden operation of a host system.

Accordingly, it would be desirable and useful to provide an accelerator system for offloading at least some of such data transactions from such motherboard system resources for remote data storage and/or networking.

BRIEF SUMMARY

One or more embodiments generally relate to data processing and, more particularly, to an accelerator system for data processing for remote data storage or other networking application.

An embodiment relates generally to a data processing system. In such an embodiment, a bus and an accelerator are coupled to one another. The accelerator has an application function block. The application function block is to process data to provide processed data to storage. A network interface is coupled to obtain the processed data from the storage for transmission.

Another embodiment relates generally to a kernel-mode driver architecture. In such an embodiment, a filter driver is to receive a request, where: the request includes a write command and payload or a read command; the filter driver generates write commands responsive to the write command and read commands responsive to the read command; and the filter driver provides for separation of command information from data for taking separate processing paths. A device driver is to receive the write commands and the payload or the read commands from the filter driver to provide to a peripheral interface. A port driver is to receive the write commands or the read commands from the filter driver to provide to the peripheral interface.

Yet another embodiment relates generally to a computer system. In such an embodiment, a general-purpose processor is for execution of a user application in an application mode and kernel-mode drivers in a kernel mode. An accelerator system is coupled to the general-purpose processor via a first bus, where the kernel-mode drivers include a class driver, a filter driver, a device driver, a stack driver, and a port driver. The class driver is in communication with the user application to receive a request packet to provide a request block in response to the request packet. The filter driver is in communication with the class driver to receive the request block. The request block includes a command and a system payload pointer. The filter driver generates first commands and second commands responsive to the command, where each of the first commands and the second commands include a same set of local payload pointers generated by the filter driver. The device driver is in communication with the filter driver to receive the system payload pointer and the first commands, and the device driver is in communication with the accelerator system to provide the first commands and the payload pointer thereto.

Still yet another embodiment relates generally to a method for processing data. In such an embodiment, data and a system payload pointer are provided from a host system to an accelerator system. The data is processed in the accelerator system to provided processed data. The processed data is stored in memory of the accelerator system. The system payload pointer is converted into at least one local payload pointer for the storing. The at least one local payload pointer is passed to an interface. The processed data is accessed from the memory by the interface using the at least one local payload pointer. The processed data accessed by the interface is transmitted.

A further embodiment relates generally to another method for processing data. In such an embodiment, a command and a payload pointer are provided to an accelerator system. The accelerator system obtains data responsive to the payload pointer. The data is processed by the accelerator system responsive to the command to provide processed data. The processed data is stored locally in memory of the accelerator system. A memory access is initiated by a network interface of the accelerator system. The processed data is obtained from the memory responsive to the memory access, and the processed data obtained is transmitted by the network interface to cloud storage.

A yet further embodiment relates generally to a method for a kernel-mode driver. In such an embodiment, a request is obtained by a filter driver, where the request includes a write command and payload or a read command. Generated by the filter driver are write commands responsive to the write command or read commands responsive to the read command. Received by a device driver are the write commands and the payload or the read commands from the filter driver to provide to a peripheral interface. Received by a port driver are the write commands or the read commands from the filter driver to provide to the peripheral interface.

A still yet further embodiment relates generally to a non-transitory machine-readable medium having stored thereof information representing instructions that, when executed by a processor, cause the processor to perform operations. In such an embodiment, a request is provided to a filter driver, where the request includes a write command and payload or a read command. Generating by the filter driver are write commands responsive to the write command or read commands responsive to the read command. Received by a device driver are the write commands and the payload or the read commands from the filter driver to provide to a peripheral interface, and received by a port driver are the write commands or the read commands from the filter driver to provide to the peripheral interface.

Lastly, an embodiment relates generally to another non-transitory machine-readable medium having stored thereof information representing instructions that, when executed by a processor, cause the processor to perform operations. In such an embodiment, data and a system payload pointer are provided from a host system to an accelerator system, where the data is processed by the accelerator system to provided processed data. The processed data is stored in memory of the accelerator system. The system payload pointer is converted into at least one local payload pointer for the storing. The at least one local payload pointer is passed to an interface, where the processed data is accessed from the memory by the interface using the at least one local payload pointer.

BRIEF DESCRIPTION OF THE DRAWING(S)

Accompanying drawing(s) show exemplary embodiment(s) in accordance with one or more embodiments; however, the accompanying drawing(s) should not be taken to limit the invention to the embodiment(s) shown, but are for explanation and understanding only.

DETAILED DESCRIPTION

Figure 1:
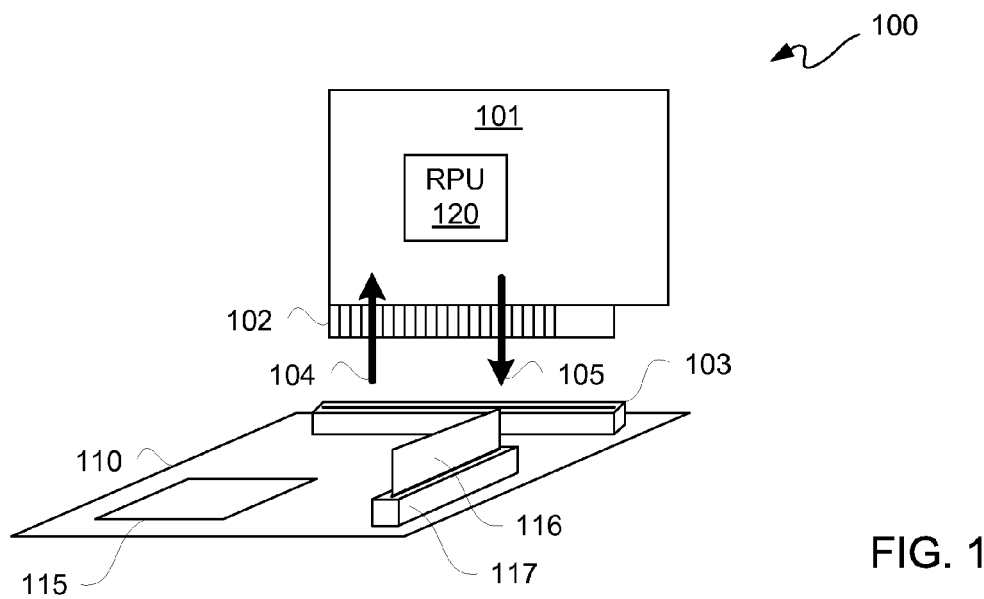
FIG. 1 is a block diagram depicting an exemplary embodiment of a host system.

In the following description, numerous specific details are set forth to provide a more thorough description of the specific embodiments of the invention. It should be apparent, however, to one skilled in the art, that the invention may be practiced without all the specific details given below. In other instances, well-known features have not been described in detail so as not to obscure the invention. For ease of illustration, the same number labels are used in different diagrams to refer to the same items; however, in alternative embodiments the items may be different. Furthermore, although particular integrated circuit parts are described herein for purposes of clarity by way of example, it should be understood that the scope of the description is not limited to these particular examples as other integrated circuit parts may be used.

Reference will now be made in detail to embodiments, examples of which are illustrated in the accompanying drawings. In the following detailed description, numerous specific details are set forth in order to provide a thorough understanding of the following described embodiments. It should be apparent, however, to one skilled in the art, that the embodiments described below may be practiced without all the specific details given below. Moreover, the embodiments are not intended to be exhaustive or to limit the invention to the precise forms disclosed, and modifications and variations are possible in light of the following teachings or may be acquired from practice of the invention. The embodiments were chosen and described in order to best explain principles and practical applications of the invention to enable others skilled in the art to utilize the invention in various embodiments and with various modifications as are suited to the particular use contemplated. In other instances, well-known methods, procedures, components, circuits, and networks have not been described in detail so as not to unnecessarily obscure the described embodiments.

For purposes of explanation, specific nomenclature is set forth to provide a thorough understanding of the various inventive concepts disclosed herein. However, the terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Inventive concepts described herein may be embodied as apparatus, method, system, or computer program product. Accordingly, one or more of such embodiments may take the form of an entirely hardware embodiment, an entirely software embodiment (including firmware, resident software, and micro-code, among others) or an embodiment combining software and hardware, and for clarity any and all of these embodiments may generally be referred to herein as a "circuit," "module," "system," or other suitable terms. Furthermore, such embodiments may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations in accordance with inventive concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

The embodiments are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various embodiments. In this regard, each block in the flowchart or block diagrams may represent a module, segment, or portion of code, which comprises one or more executable instructions for implementing the specified logic function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching operations, correlation operations, comparison operations and decision operations. It should also be understood that the word "component" as used herein and in the claims is intended to encompass implementations using one or more lines of software code, and/or hardware implementations, and/or equipment for receiving manual inputs.

FIG. 1 is a block diagram depicting an exemplary embodiment of a host system 100. Host system 100 includes motherboard 110 having a daughter card 101. Daughter card 101 may have an interface connector 102 for coupling to motherboard 110 via socket 103. So even though daughter card 101 is not illustratively depicted as socketed, it should be understood that for operation of daughter card 101, interface connector 102 may be slotted in socket 103.

Motherboard 110 may have a central processing unit ("CPU") 115, which may include one or more processor cores. Additionally, it should be understood that a motherboard may have more than one CPU, as well as chipset chips among other components not illustratively depicted here for purposes of clarity and not limitation. Additionally, motherboard 110 may have a socket 117 to which a memory module 116 may be inserted. For purposes of clarity by way of example not limitation, it shall be assumed that memory module 116 is system memory coupled to CPU 115 by one or more buses, including a system bus not illustratively shown for purposes of clarity and not limitation. In other embodiments, system memory may be directly attached to motherboard 110.

Daughter card 101 may include a reconfigurable processor unit ("RPU") 120 in order to provide acceleration for processing data in comparison to processing data in software. RPUs are described in additional detail in U.S. Pat. Nos. 7,856,545 and 7,856,546, each of which is incorporated by reference herein in its entirety.

Data may be provided as input as generally indicated by arrow 104 from motherboard 110. More particularly, data may be read from memory module 116, used for system memory, for input to RPU 120. After such data is processed by RPU 120, such processed data may be provided as output from daughter card 101 to system memory 116 as generally indicated by output arrow 105. However, this may impose a burden on resources of motherboard 110 not imposed in a host system 200 illustratively depicted in FIG. 2.

Figure 2:
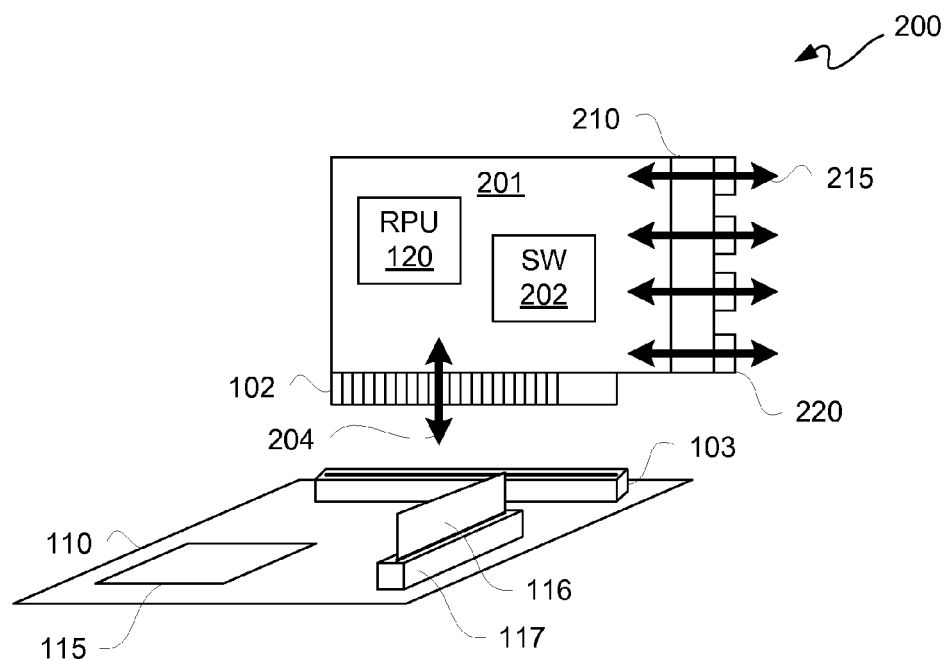
FIG. 2 is a block diagram depicting another exemplary embodiment of a host system.

FIG. 2 is a block diagram depicting another exemplary embodiment of a host system 200. Host system 200 includes computer motherboard 110 having a daughter card 201. As motherboard 110 is the same in both FIGS. 1 and 2, the above description of motherboard 110 is not repeated for purposes of clarity.

Daughter card 201 likewise has an RPU 120 and an interface connector 102. However, rather than unidirectional input and output traffic as illustratively depicted in FIG. 1 with arrows 104 and 105, respectively, traffic to and from daughter card 201 may be bidirectional as generally indicated by arrow 204, as there is less traffic between motherboard 110 and daughter card 201 in host system 200 than in host system 100. However, it should be understood that either bidirectional or unidirectional traffic as described herein may be used in host system 200.

Additionally, daughter card 201 includes a switch 202, a network interface 210, and transceiver modules 220. Even though four transceiver modules 220 are illustratively depicted, it should be understood that fewer or more transceivers may be used. Transceiver modules 220 are for bidirectional traffic as generally indicated with arrows 215. Furthermore, even though transceivers are described, it should be understood that separate receivers and transmitters may be used.

An accelerator system is described below in terms of daughter card 201, for reasons that will become more apparent from the following description.

An accelerator system described below is employed for networking and/or storage applications. For purposes of clarity by way of example not limitation, a secure data storage application is described. However, it will be appreciated that other uses of daughter card 201 may be employed. For example, daughter card 201 may be utilized to implement a secure network, functions such as data compression, and/or virus checking, in addition to or apart from secure data storage. Other uses should be apparent from the following description.

As described below in additional detail, for secure data storage, amounts of data may be processed before transferring over a link, whether a network link and/or a storage link. Such processing may include functions such as encryption, decryption, authentication, error-checking, addition of an error code, data parsing, and/or addition of redundancy, among other types of data processing. Such data processing may be computationally or otherwise motherboard resource intensive, and thus offloading such processing to other hardware, such as an RPU 120, may cause a host system, such as host system 200, to operate faster. For example, it should be appreciated that by not tying up a general-purpose CPU 115 by attempting to do such data processing entirely in software, use of an RPU 120 may accelerate not only such data processing, but also may free up motherboard resources for other tasks.

As described below in additional detail, embodiments of accelerator systems are provided in order to enhance throughput while reducing load on one or more motherboard resources. Again, for purposes of clarity by way of example not limitation, it shall be assumed that the data processing operations are performed for a secure data storage application. Such secure data storage application may include encrypting, decrypting, data parsing, and data concatenating. However, it should be understood that the described embodiments of accelerator systems may be used for applications other than secure data storage, as well as other forms of secure data storage.

In an embodiment, daughter card 201 may be a Peripheral Component Interconnect Express ("PCIe") card that interfaces via a PCIe bus to a CPU 115 of a motherboard 110, or more particularly a main CPU of a motherboard 110. In an embodiment, a 16-lane PCIe bus is used; however, other sizes and types of busing may be used.

Motherboard 110 may be a server or workstation motherboard having a Southbridge chip ("Southbridge") interconnected to a PCIe bus. Such Southbridge may be interconnected to a Northbridge chip ("Northbridge"), where such Northbridge is interconnected to a main CPU and system memory. In other server or workstation motherboards, the Northbridge may be eliminated, and the Southbridge may communicate directly with the main CPU. Furthermore, a motherboard may include more than one Northbridge and/or Southbridge, as well as more than one CPU.

It should be appreciated that there is a limited amount of bandwidth in a Northbridge and/or Southbridge in any of these system architectures. Furthermore, there is limited bandwidth of one or more buses, including a system bus, interconnecting for example a main CPU with a Northbridge and/or Southbridge. Bandwidth of a PCIe bus interfacing daughter card 201 to CPU 115 is also a limited resource.

Use of daughter card 201, as described below in additional detail, may keep a significant amount of high-bandwidth data traffic local to such card so as to reduce load, for example, on a main CPU, a Southbridge, a Northbridge, and/or other motherboard system resources. Additionally, it should be appreciated that daughter card 201 may use a readily available interface, such as PCIe or any other readily available interface, so as to be used with a readily available server or workstation motherboard.

Figure 3:
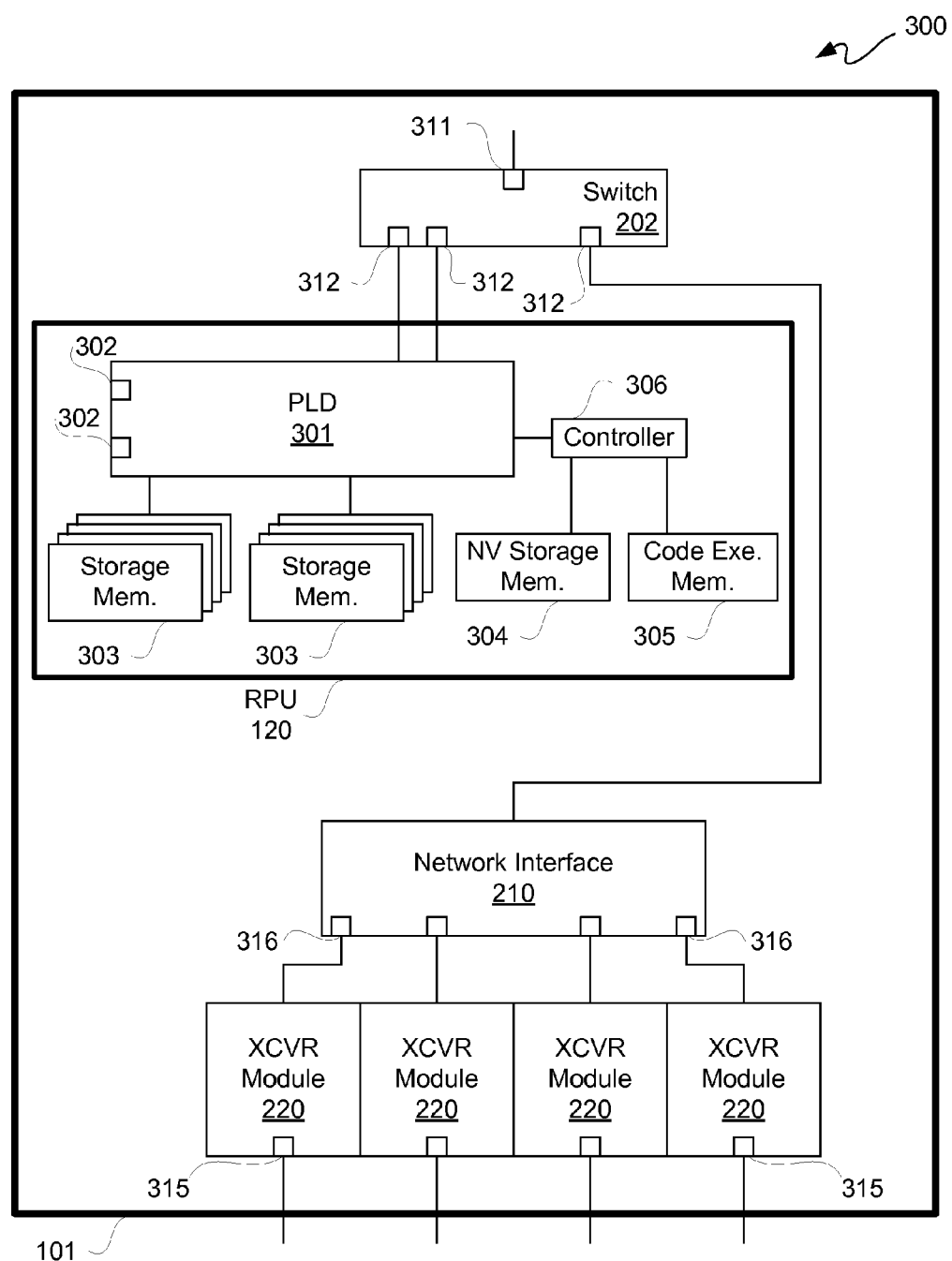
FIG. 3 is a block diagram depicting an exemplary embodiment of an accelerator system.

FIG. 3 is a block diagram depicting an exemplary embodiment of an accelerator system 300. Accelerator system 300 is a data processing system. With simultaneous reference to FIGS. 2 and 3, accelerator system 300 is further described.

Accelerator system 300 may be located on daughter card 201, as previously described. Accelerator system 300 includes RPU 120, switch 202, network interface 210, and transceiver modules 220. For purposes of clarity by way of example and not limitation, an exemplary embodiment of each of these components of accelerator system 300 is described below. However, it will be appreciated that these and/or other components may be used in accordance with the following description.

Even though a daughter card 201 is described as having RPU 120, switch 202, network interface 210, and transceiver modules 220, it should be understood that in other embodiments a System-on-Chip ("SoC") may be used, as for example an FPGA may include many or all of the resources of daughter card 201. Thus, the number of chips on daughter card 201 may be significantly reduced. Furthermore, in still other embodiments, daughter card 201 may be socketed to a CPU socket or bus socket other than a peripheral socket, such as a PCIe socket, or accelerator system 300 may be directly mounted on motherboard 110. However, for purposes of clarity and not limitation, a daughter card 201 embodiment is described below, even though other embodiments may be used.

Switch 202 may be a PCIe switch having multiple ports. These ports may be configured with any of a variety of different data widths and may be used to move data from any port to any other port without intervention by a main CPU 115 of a motherboard 110. One of such ports of such PCIe switch may be interconnected to a connector, such as socket 103, which attaches to a PCIe bus on a motherboard 110 when daughter card 201 is plugged in. Such a port may be referred to as an upstream port in a bus hierarchy, because such port is for coupling to a main CPU 115 controlling such PCIe bus, namely such port or bus associated therewith is on a host-system side.

In FIG. 3, a block labeled 311 illustratively depicts such an upstream port. In an embodiment, upstream port 311 may be a PCIe Generation 2 ("Gen2") by 16 lane port. Other PCIe ports 312 of switch 202 may be referred to as downstream ports, because such other ports 312 interconnect to devices farther away from such main CPU 115 in a bus hierarchy than such upstream port 311.

In an embodiment, such downstream ports 312 may each be PCIe Gen2 by 8 lane ports. In this exemplary embodiment, four PCIe ports of switch 202 are illustratively depicted; however, it should be understood that a minimum of three ports may be used in another embodiment, where there is only one PCIe downstream port 312 for communication with PLD 301. PLD 301 may include hard macros or soft cores of PCIe interface ports coupled to downstream PCIe ports 312 of switch 202. It should be understood that even though the terms "upstream" port and "downstream" port are used herein, it should be understood that both types of such ports are bidirectional. The term "hard macro" generally refers to dedicated circuitry, and the term "soft core" generally refers to a circuit instantiated in programmable logic through use of a configuration bitstream.

The main CPU, such as CPU 115, of motherboard 110, may enumerate a PCIe bus, namely determine all devices connected to such PCIe bus and some characteristics thereof. After CPU 115 has acquired such information, other information, including commands and/or data, may be transferred to or from any of such devices connected to such PCIe bus. Additionally, switch 202 may include peer-to-peer routing, for example routing data from one downstream device to another downstream device through switch 202 without having to go through CPU 115. In an embodiment, a PEX8648 switch device from PLX Technology, Inc., of Sunnyvale, Calif., is used as PCIe switch 202; however, it should be appreciated that this or another similar device may likewise be used.

An accelerator, such as RPU 120, may include a Programmable Logic Device 301, such as a Field Programmable Gate Array ("FPGA") or other integrated circuit having field programmable logic for instantiation of circuitry by programming with a configuration bitstream. Such configuration bitstream may be packet-based or frame-based for example. However, in other embodiments, an Application-Specific Standard Processor ("ASSP"), an Application Specific Integrated Circuit ("ASIC"), or any other integrated circuit ("IC") having programmable logic may be used to provide an accelerator. For purposes of clarity by way of example and not limitation, it shall be assumed that programmable logic device 301 is an FPGA; however, in other embodiments other integrated circuits may be used as indicated.

Use of PLD 301 allows one or more algorithms, such as for example an encryption algorithm, a decryption algorithm, a data parsing algorithm, and/or a data concatenation algorithm such as for a secure data storage application, to be instantiated as hardware circuitry via field programmable logic as an application function block. The ability to have any or all of these tasks performed in hardware rather than software accelerates (i.e., speeds up) data processing, such as for secure data storage for example. However, it should be appreciated that these or other algorithms may be instantiated, in whole or in part, in programmable logic fabric of PLD 301, such as an FPGA for example, in other embodiments, such as for other applications.

Additionally, PLD 301 may have expansion ports 302. In an embodiment, each of expansion ports 302 has four lanes. Expansion ports 302 may be used to allow RPU 120 to connect to one or more other RPUs 120 so that they can share large processing tasks. Additionally or optionally, expansion ports 302 may be used as a way to add additional functions to RPU 120.

RPU 120 may further include storage memory 303, nonvolatile storage memory 304, code executable memory 305, and a controller 306. Controller 306 may be a Complex Programmable Logic Device ("CPLD"). Nonvolatile storage memory 304 may be a form of flash memory or a form of EPROM for example. Code executable memory 305 may be NOR flash or SRAM for example. Storage memory 303 may be SRAM, DRAM or NAND flash for example. Other details regarding RPU 120 may be found in U.S. Pat. Nos. 7,856,545 and 7,856,546.

For purposes of clarity and not limitation, it shall be assumed that storage memory 303 is DRAM which is externally coupled to a memory interface implemented in the form of programmable logic in PLD 301. Use of DRAM for a secure data storage application allows any data therein to be generally erased once power is removed from such DRAM, as DRAM is a volatile form of memory.

DRAM 303 may be any of a variety of types of DRAM including without limitation DDR, DDR2 or DDR3 DRAM. In an embodiment, RPU 120 has DDR3 DRAM for DRAM 303; however, other types of DDR DRAM, as well as other types of DRAM, may be used.

In an embodiment, a Stratus IV EP4SGX230 FPGA from Altera Corporation of San Jose, Calif. is used for PLD 301. However, it should be understood that other FPGAs, such as FPGAs from Xilinx, Inc. of San Jose, Calif., may be used. Moreover, it should be understood that PCIe daughtercard 201 includes RPU 120 with DRAM interconnected to an FPGA via a memory controller/interface ("memory interface") of such PLD 301. Thus, DRAM 303 is "local" or "subsystem" memory of daughter card 201 or PLD 301. The term "local" or "subsystem" memory is used to differentiate between memory on daughtercard 201 or directly coupled to PLD 301 in contrast to memory elsewhere in a host system, including without limitation system memory 116.

Network interface 210 of accelerator system 300 is coupled to another downstream PCIe port 312 of switch 202. Network interface 210 may be a network interface chip, which may be referred to as a "NIC" though not to be confused with a network interface card. However, in other embodiments, a network interface card may be used instead of a network interface chip.

Network interface 210 may include ports 316. For purposes of clarity and not limitation, it shall be assumed that ports 316 are bidirectional high-speed serial I/O ports. Serial I/O ports 316 allow for transfer of data to or from devices or systems coupled via a network to daughtercard 201. Such other devices or systems may be remotely located from host system 200 associated with daughtercard 201.

Network interface 210 may include one or more physical devices. In particular, a Media Access Control ("MAC") and Physical Layer ("PHY") functions of network interface 210 may reside in separate physical devices. Optionally, network interface 210 may be implemented using programmable logic of PLD 301. Such a programmable logic implementation of network interface 210, however, uses a substantial portion of the programmable resources of PLD 301.

Network interface 210 may be used to offload processing associated with network protocols, such as Transmission Control Protocol/Internet Protocol ("TCP/IP"), Internet Small Computer System Interface ("iSCSI"), or Fibre Channel over Ethernet ("FCoE"), among others, from a main CPU 115 of a host system. In an embodiment, a Terminator 4 ASIC from Chelsio of Sunnyvale, Calif., is used for a network interface chip. However, in other embodiments, other similar network interface chips may likewise be used. For example other network interface chips may be obtained from Broadcom Corporation.

Coupled to serial I/O ports 316 of network interface 210 are transceiver modules 220. In this exemplary embodiment, there are four transceiver modules 220; however, fewer or more than four transceiver modules 220 may be used in other embodiments. In other embodiments, transceiver modules 220 may be omitted with respect to communication with one or more proximal devices, as network interface 210 may communicate directly with one or more proximal devices coupled via a network; particularly if such one or more proximal devices coupled via a network are relatively close to daughter card 201. In this embodiment, enhanced Small Form-factor Pluggable ("SFP+") transceivers are used. SFP+ transceivers are available for many different speeds, protocols, and types of physical connections. In this embodiment, ports 315 of a transceiver modules 220 are 10 Gb/s ports, which may be used for 10 Gigabit Ethernet or 8 Gb/s Fibre Channel connectivity; however, other types of transceivers with other bandwidths may be used in other embodiments. Transceiver modules 220 and network interface 210 may support metal wire or optical cabling for interconnectivity via high-speed serial ports 315. Numerous other components of daughtercard 201, such as power supplies, connectors, capacitors, and resistors, among others, are not described herein for purposes of clarity.

Figure 4:
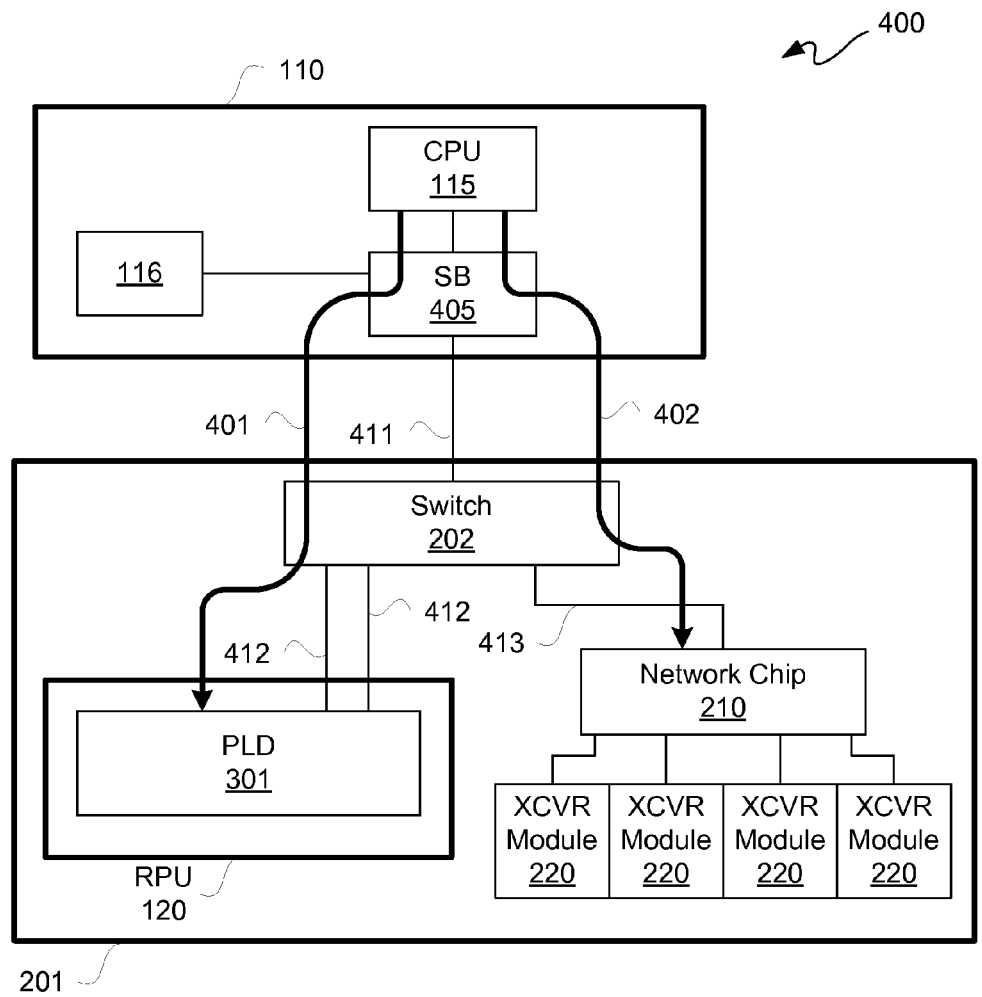
FIG. 4 is a block diagram depicting an exemplary embodiment of control flow for the accelerator system of FIG. 3.

FIG. 4 is a block diagram depicting an exemplary embodiment of control flow for accelerator system 300 of FIG. 3. In FIG. 4, a host system 400 includes motherboard 110 coupled to daughtercard 201 via PCIe bus 411. Arrows 401 and 402 illustratively depict direction of control flow for setting up communication between devices as described below in additional detail.

Motherboard 110 may include system memory 116, a main CPU 115, and a Southbridge ("SB") 405, such as of a CPU or motherboard chipset. PCIe bus 411 interconnects switch 202 to Southbridge 405. PCIe buses 412 interconnect switch 202 to PLD 301. PCIe bus 413 interconnects switch 202 to network interface 210. Thus, PLD 301 and network interface 210, as well as switch 202, are discoverable by CPU 115.

Switch 202, PLD 301, and network interface 210 appear as three separate PCIe devices to CPU 115. More particularly, responsive to CPU 115 enumerating PCIe buses 411 through 413, CPU 115 discovers PCIe switch 202 and what appears as three downstream devices. Two of these three downstream devices are associated with two PCIe ports in PLD 301, and the other of these three downstream devices is associated with a PCIe port of network interface 210.

By discovering such downstream devices, CPU 115 may initiate data transfers to or from PLD 301 and/or network interface 210. More particularly, by discovering PCIe ports of switch 202, PLD 301, and network interface 210, CPU 115 may configure such devices and allocate address spaces, such as physical address spaces for example, respectively to each of such devices. Allocation of such address spaces allows CPU 115 to communicate with switch 202, PLD 301, and network interface 210, and additionally may allow switch 202, PLD 301, and network interface 210 to communicate with each other without intervention from CPU 115 or other motherboard system resources.

Figure 5:
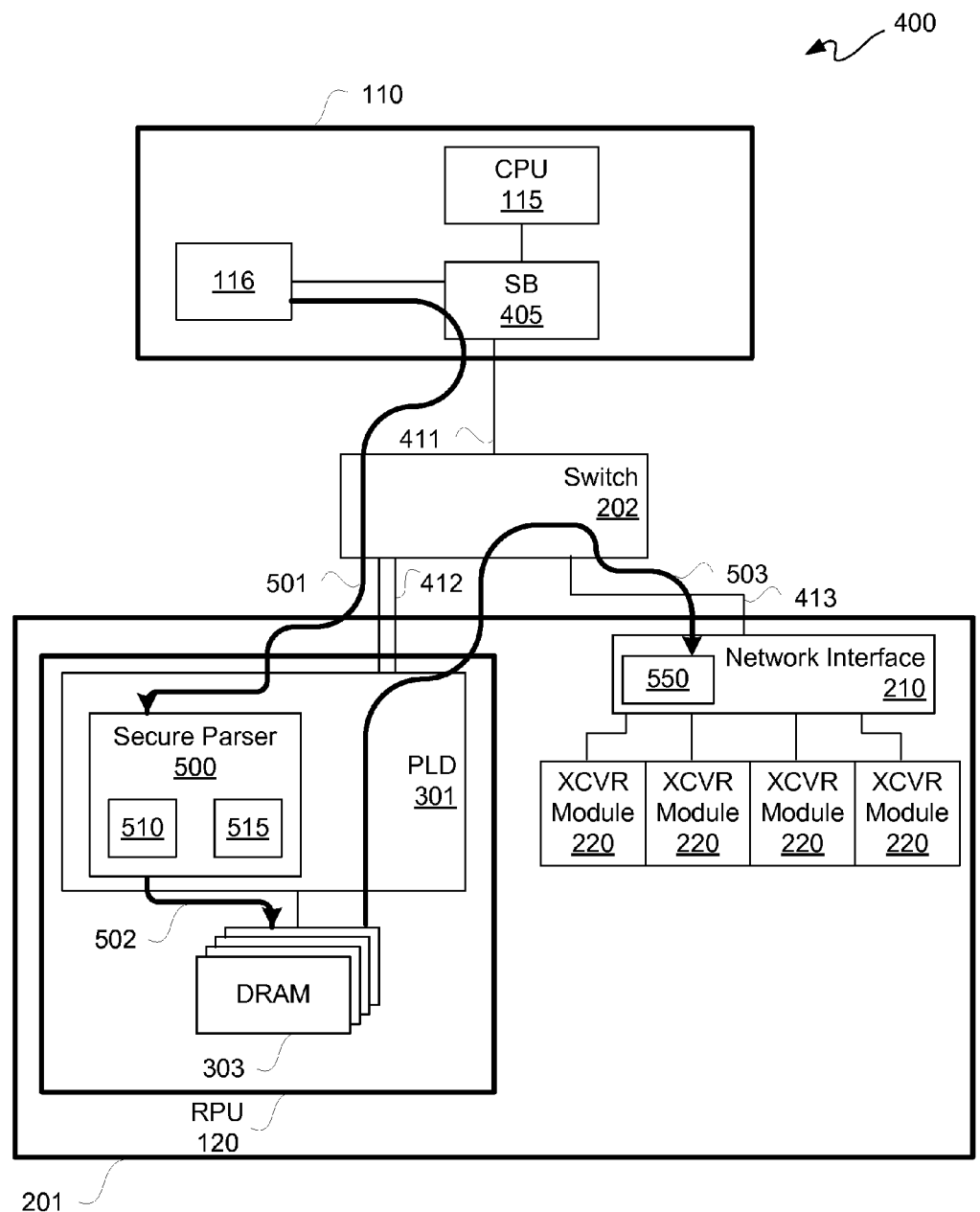
FIG. 5 is a block diagram depicting an exemplary embodiment of data flow in a write direction for the accelerator system of FIG. 3.

FIG. 5 is a block diagram depicting an exemplary embodiment of data flow in a "write" direction for accelerator system 300 of FIG. 3. In FIG. 5, CPU 115 may cause a data unit of any size stored in system memory 116 to flow via PCIe bus 411 for receipt by switch 202, and then such data unit may be passed from switch 202 for receipt by PLD 301 via a PCIe bus 412, as generally indicated by arrow 501. It should be appreciated that data need not initially be accessed or read from system memory 116, but may be read from other memory or storage of or accessible by host system 400 in accordance with the description herein. However, for purposes of clarity by way of example and not limitation, it shall be assumed that an initial data unit is read from system memory 116. Furthermore, for purposes of clarity and not limitation, it may be assumed that such data unit is accessed as a data block, even though other sizes may be used.

Such data block may be processed by a compute function of PLD 301. In this exemplary embodiment for secure data storage, a secure parser 500 may be used as such compute function. More particularly, such secure parser 500 may include a parse block 510 and a restore block 515. Parse block 510 may encrypt, parse, and/or split data for example, to provide outbound traffic. Restore block 515 may restore inbound traffic, such as restoring data using restore functions of secure parser 500 for example, to provide data in its original form.

Secure parser 500 may be instantiated in whole or in part using field programmable logic of PLD 301. Algorithmic operations performed by secure parser 500 may include one or more arithmetic operations or other data processing operations. Thus for example, such data unit or other information may be cryptographically split into any size units of data. Such cryptographically split units of data for example may then be stored in DRAM 303, or other subsystem or local memory, coupled to PLD 301, as generally indicated by arrow 502.

It should be understood that PLD 301 may have a memory interface, whether a hard macro or a soft core, for writing data to or reading data from DRAM 303, where such memory interface is accessible by secure parser 500. PLD 301 may have internal memory which may be used instead of DRAM 303, provided however, the amount of such internal memory is sufficient for an application, such as secure data storage for example.

For network interface 210 to transmit encrypted data units stored in DRAM 303, a Direct Memory Access ("DMA") operation may be initiated by network interface 210 using a DMA controller 550 thereof. In other words, DMA controller 550 of network interface 210 may provide one or more pointers or addresses to read out encrypted data units from DRAM 303, as described below in additional detail. It should be understood that DMA controller 550 is effectively coupled to DRAM 303 via a memory interface of PLD 301 through PCIe bussing and peer-to-peer routing of switch 202.

In order to obtain access to DRAM 303 via a memory interface of PLD 301, such DMA access may use addresses allocated by CPU 115, for example, as previously described, to provide a read request that passes through switch 202 to PLD 301 using PCIe bussing 413 and 412 and peer-to-peer routing of PCIe switch 202. Such read request is processed by PLD 301, including a memory interface thereof, to read encrypted data units out of DRAM 303. Such read encrypted data units are passed back to network interface 210 using the reverse of the above-described path, as generally indicated by arrow 503. Such read data units may then be transmitted via one or more of transceiver modules 220.

Accordingly, it should be appreciated that once an initial data unit is passed from motherboard 110 to daughtercard 201, processed data from such data unit need not be routed back over a host system bus, such as PCIe bus 411. Thus, such processed data does not have to encumber CPU 115 or other motherboard system resources. In other words, data processing of such data unit is offloaded from CPU 115, and subsequent movement of such processed data units does not have to pass over a system bus or otherwise encumber performance of other operations on motherboard 110. In particular, this avoids burdening a system PCIe bus 411, Southbridge 405, a Northbridge, and/or a main CPU 115.

In an embodiment, RPU 120 may add redundancy as part of a parse function, namely parse block 510. In such an embodiment, an amount of data passing between RPU 120 and network interface 210 may be substantially greater due to addition of redundant data to an amount of data originally passed from system memory 116 to RPU 120 for such processing by parse block 510. It should be appreciated that in such an embodiment, motherboard resources are not burdened with having to handle such added redundant data, as well as any information associated therewith for such redundancy.

Figure 6:
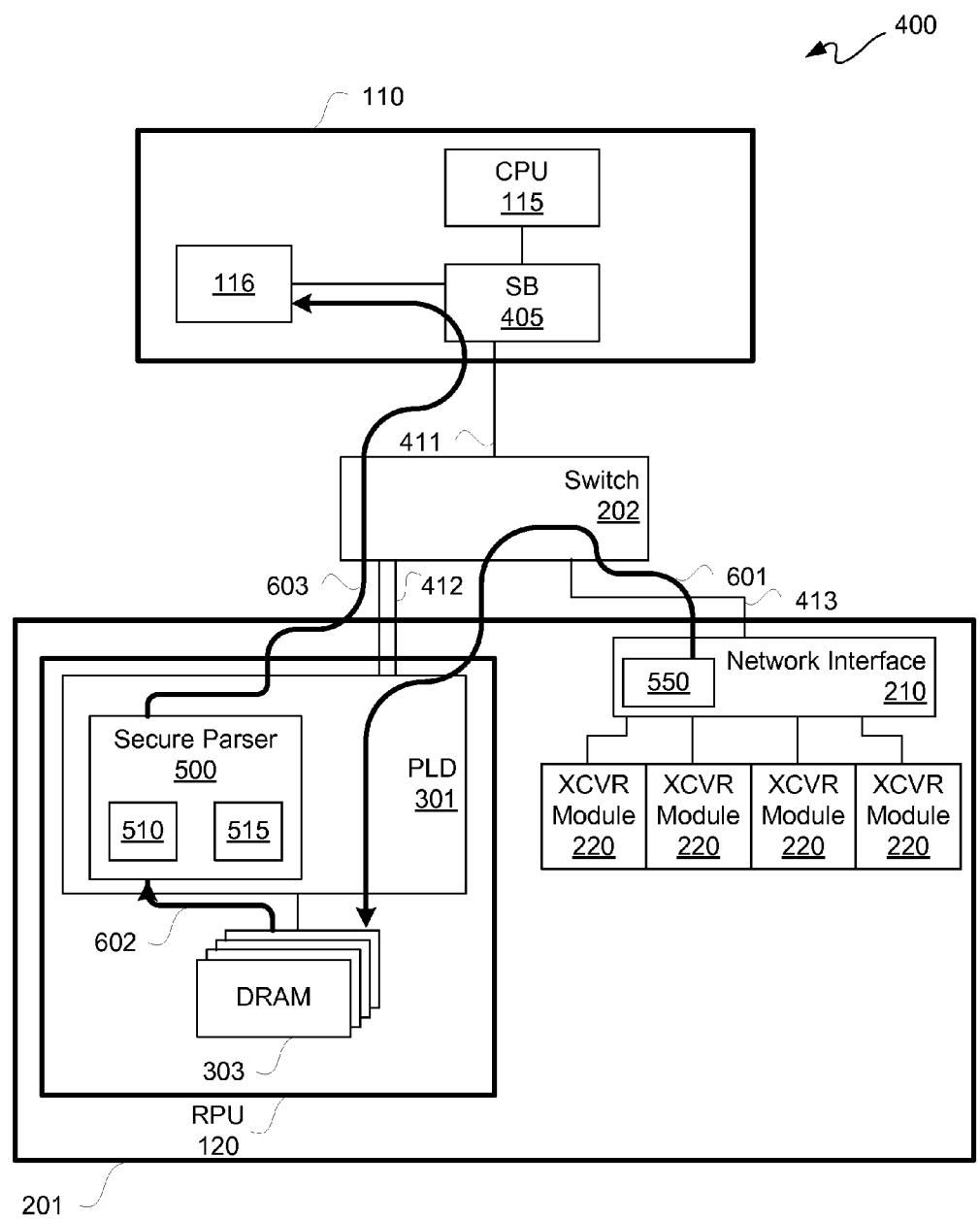
FIG. 6 is a block diagram depicting an exemplary embodiment of data flow in a read direction for the accelerator system of FIG. 3.

FIG. 6 is a block diagram depicting an exemplary embodiment of data flow in a "read" direction for accelerator system 300 of FIG. 3. In FIG. 6, data generally flows from network interface 210 to PLD 301 through switch 202 for processing by an application function block of PLD 301. More particularly, data blocks may be received by network interface 210 via one or more of transceiver modules 220, such as for reverse processing for example.

Secure parser 500 is the same unit in FIGS. 5 and 6. However, in FIG. 6, secure parser 500 may be thought of as a secure "restorer" when in a restore mode. Restoration may vary from application-to-application. Accordingly, for the above-mentioned secure data storage restoration may generally be thought of as providing a data unit or units representing an original data unit or units, respectively.

Responsive to a DMA initiated write by DMA controller 550 of network interface 210, such data blocks may be written to DRAM 303. Such a DMA initiated write command as well as received data blocks follow a direction as generally indicated by arrow 601. For example, data blocks may go from network interface 210 to switch 202 via PCIe bus 413, and from switch 202, such data blocks may be routed to PLD 301 for DRAM 303 via a PCIe bus 412. Again, addressing and peer-to-peer routing as previously described, though in a reverse data flow direction, may be used. Such data blocks may be written to DRAM 303, and from DRAM 303, such data blocks may be read out to a restore function block, such as restore block 515, as generally indicated by arrow 602.

Restore block 515 may be instantiated in whole or in part in field programmable logic of PLD 301. In an embodiment, assuming data blocks obtained by network interface are encrypted, data read from memory 303 into restore block 515 may be decrypted by restore block 515, as described elsewhere herein. For example, two or more parsed and split portions of original data may be read from DRAM 303 into restore block 515, such as restored according to any of the techniques described in U.S. Patent Publication US20100299313A1 for example.

The resulting data unit or units may be provided to system memory 116 in a data flow direction as generally indicated by arrow 603. More particularly, such data unit or units may be provided from PLD 301 to switch 202 via a PCIe bus 412, and then from switch 202 to Southbridge 405 via PCIe bus 411. Such data unit or units may be provided from Southbridge 405 to system memory 116. It should be understood that such a data unit or units transferred via PCIe bus 411 may already be completely processed with respect to a secure data storage application. Accordingly, such PCIe bus 411, as well as CPU 115 among other resources of motherboard 110, is not burdened with the processing of such data unit or units received by network interface 210. Furthermore, it should be appreciated that each such data unit may be an exact copy of the data unit originally sent from system memory 116, as previously described with reference to FIG. 5.

Figure 7:
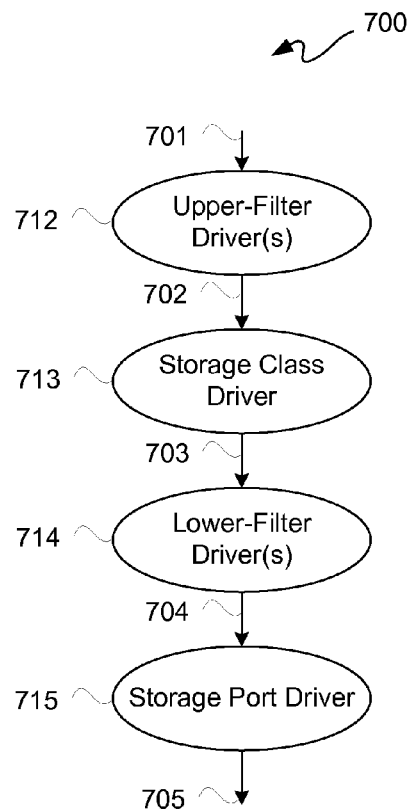
FIG. 7 is a flow diagram depicting an exemplary embodiment of a conventional storage driver architecture.

FIG. 7 is a flow diagram depicting an exemplary embodiment of a conventional storage driver architecture 700. For purposes of clarity by way of example and not limitation, the following description is based on an NT-based operating system, namely a Microsoft Windows operating system; however, it should be appreciated that other types of operating systems may be used. Moreover, for purposes of clarity by way of example and not limitation, it shall be assumed that driver architecture 700 is for a storage driver stack, even though other types of driver stacks may be used.

I/O request packets ("IRPs") 701 are obtained by one or more upper-filter drivers 712. Such IRPs may be provided from a user application or another driver higher in a storage driver stack. Thus, user applications or higher-level drivers may provide IRPs to one or more upper-filter drivers 712. Such IRPs 701 may be modified by one or more upper-filter drivers 712 before being passed to a next lower-level driver as IRP 702. Such next lower-level driver may be another storage filter driver or may be a storage class driver, such as storage class driver 713. It should be understood that filter drivers may monitor performance of an underlying device.

Storage class driver 713 may be configured to build one or more SCSI Request Blocks ("SRBs") 703 responsive to such one or more IRPs 701. Storage class driver 713 may provide such one or more SRBs 703 to one or more lower-filter drivers 714. Such one or more lower-filter drivers 714 may modify SRBs 703 to provide SRBs 704 to storage port driver 715. Storage port driver 715 may provide bus-specific commands responsive to such one or more SRBs 704 or may further modify SRBs 704 to provide one or more other SRBs. Thus, storage port driver 715 may output bus-specific commands or SRBs 705.

It should be understood that such one or more upper-filter drivers 712, unlike lower-filter drivers 714, can intercept IRPs 701 sent to a class driver, such as storage class driver 713, and can alter such IRPs 701 before forwarding them to a next-lower level device object. So, an upper-filter driver 712 can intercept read or write IRPs and transform data of such read or write IRPs, as well as define additional I/O control codes ("IOCTLs") for example to cause a user application to supply passwords or other related information.

Figure 8:
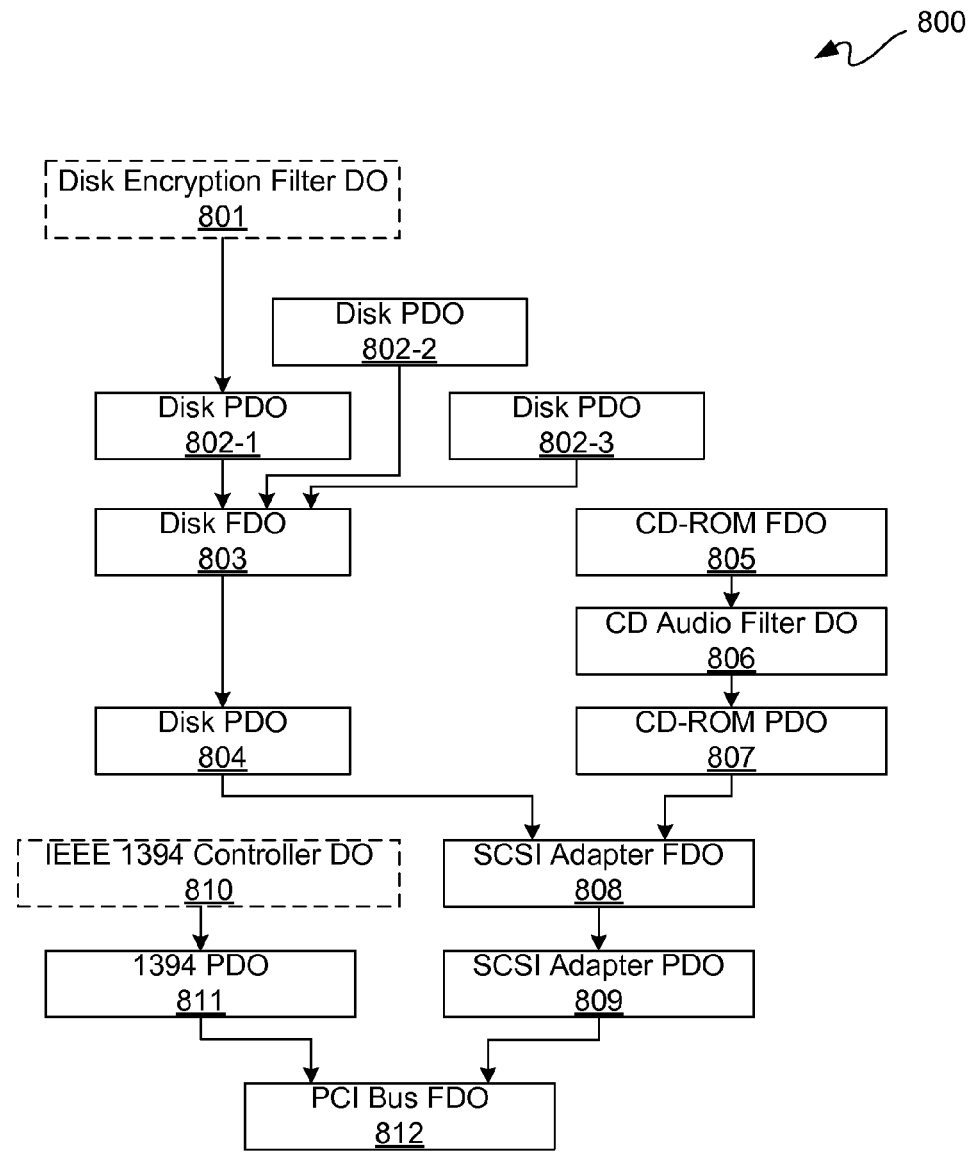
FIG. 8 is a flow diagram depicting an exemplary embodiment of a conventional device objects flow.

FIG. 8 is a flow diagram depicting an exemplary embodiment of a conventional device objects ("DO") generation flow 800. DO generation flow 800 is for a Windows driver system; however, other driver systems may be used. Optionally, at 801 a disk encryption filter device object ("DO") may be generated, such as by a disk-encryption filter driver.

Disk partition device objects ("PDOs") respectively at 802-1 through 802-3 may be generated as respective partitions, namely partition 1, partition 2, and partition 3. Such disk PDOs may be generated by a disk class driver. Such disk class driver may generate a functional DO ("FDO") for partition 0 at 803. In other words, a disk class driver creates an FDO for a disk as a whole and PDOs for each partition on such disk.

At 804, a disk PDO is generated by SCSI port/miniport driver, and at 808, a SCSI adapter FDO is generated by such SCSI port/mini port driver. Examples of other DOs that may be generated include those at 805 through 807. More particularly, at 805, a CD ROM FDO may be generated by a CD ROM driver; at 806, a CD audio filter DO may be generated by a CD audio filter driver; and at 807, a CD-ROM PDO may be generated by such SCSI port/miniport driver that generated DOs at 804 and 808. At 809, a SCSI adapter PDO may be generated by a PCI bus driver. Optionally at 810, a DO for an IEEE 1394 controller may be generated by an IEEE1394 controller driver. At 811, a 1394 adapter PDO may be generated by a PCI bus driver employed at 809, and such PCI bus driver may generate a PCI bus FDO at 812.

Figure 9:
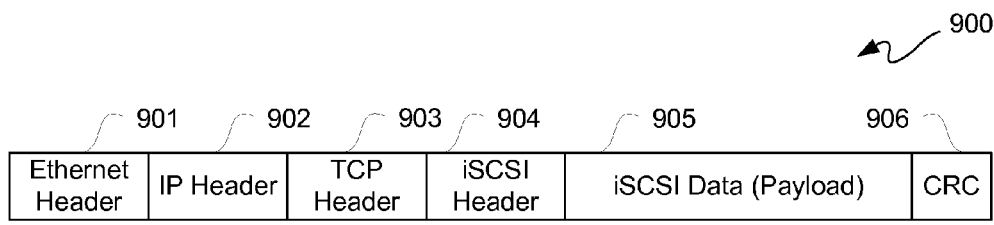
FIG. 9 is a block diagram depicting an exemplary embodiment of a conventional packet format.

FIG. 9 is a block diagram depicting an exemplary embodiment of a conventional packet format 900. Packet format 900 includes an Ethernet header 901, an IP header 902, a TCP header 903, an iSCSI header 904, iSCSI payload or data 905, and cyclic redundancy check ("CRC") bits 906. Accordingly, packet format 900 is an iSCSI packet format.

It should be appreciated that FIGS. 7 through 9 provide a general context for the description of FIGS. 13-25. Additional general context for the description of some of the figures of FIGS. 13-25 may be obtained with reference to FIGS. 10-12.

Figure 10:
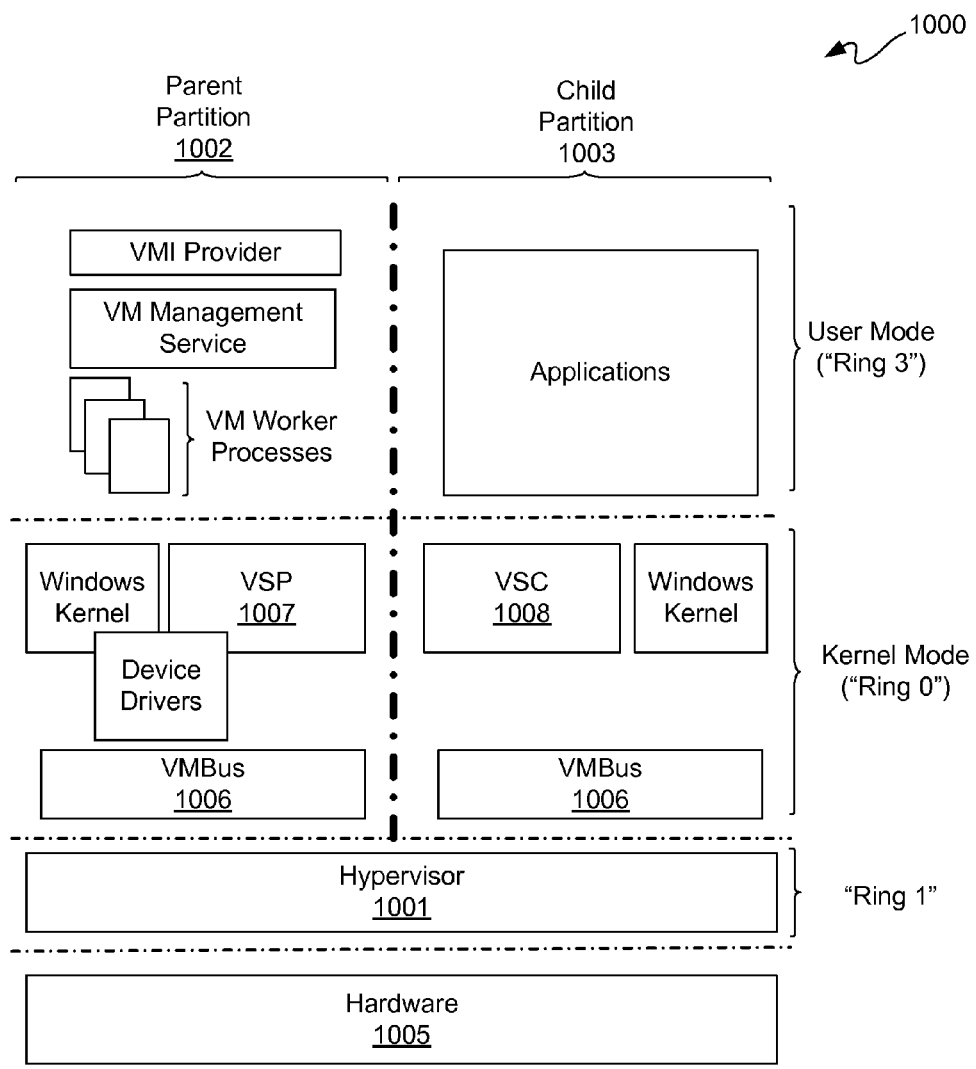
FIG. 10 is a block diagram depicting a conventional Hyper-V architecture.
Figure 11:
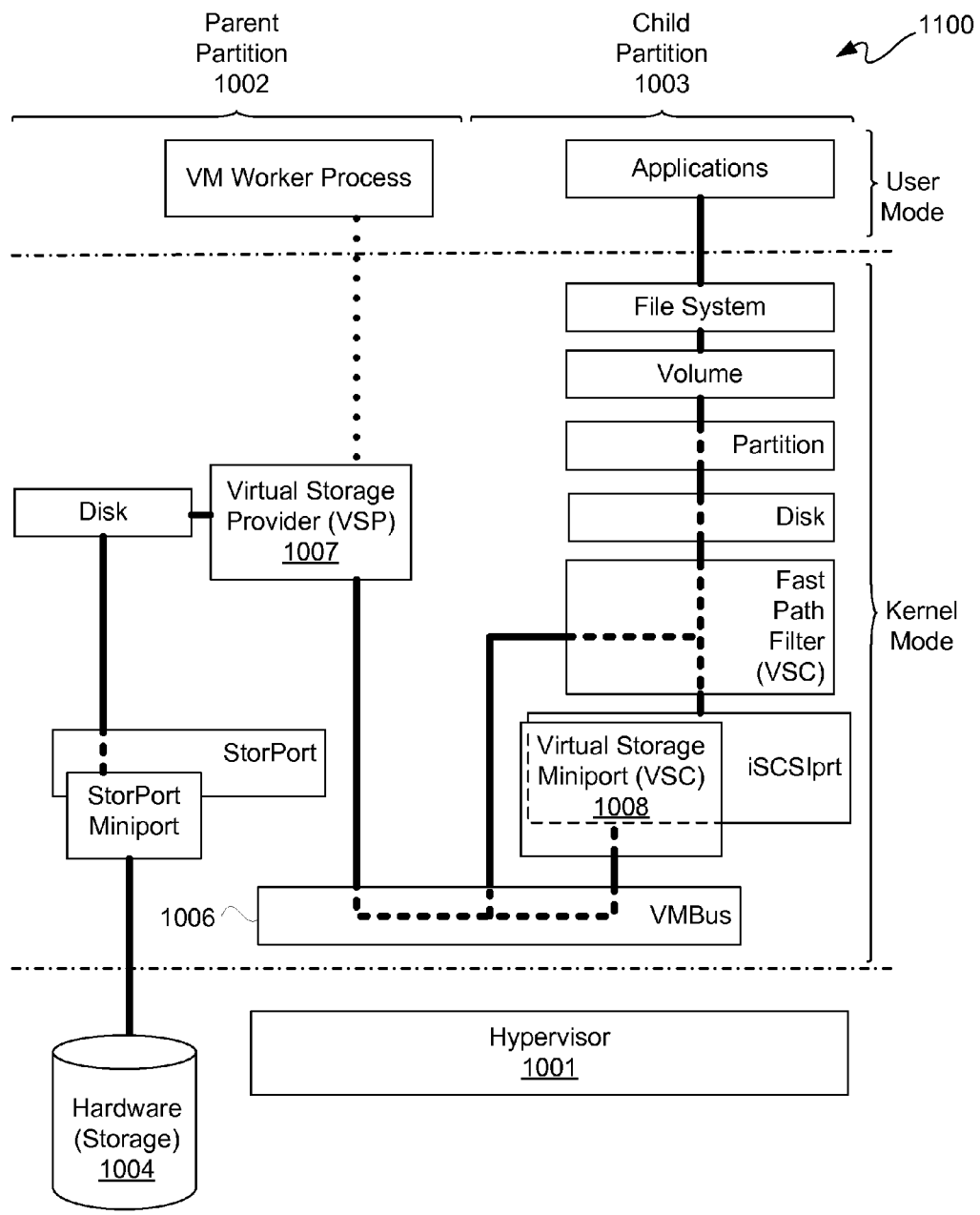
FIG. 11 is a block diagram depicting a conventional Hyper-V architecture for a storage model.

More particularly, FIG. 10 is a block diagram depicting a conventional Hyper-V architecture 1000, and FIG. 11 is a block diagram depicting a conventional Hyper-V architecture 1100 for a storage model.

With simultaneous reference to FIGS. 10 and 11, in Microsoft's Hyper-V hypervisor-based virtualization architectures 1000 and 1100, a hypervisor or virtual machine monitor ("VMM") 1001 is generally a hardware virtualization that allows multiple operating systems or virtual machines to run concurrently on a host computer. Such hardware virtualization is used to support isolation in terms of a parent partition 1002 and a child partition 1003. It should be understood that a physical device may be controlled by an existing device driver without having to create a new device driver by using such a hypervisor.

A virtualization stack generally runs in a parent partition and has direct access to hardware devices. Such parent partition 1002 creates one or more child partitions 1003 which may host one or more guest operating systems. Child partitions 1003 do not have direct access to hardware resources 1005, such as disk storage 1004 for example, but do have a virtual view of such resources in terms of virtual devices. Requests to virtual devices may be redirected via a virtual machine bus ("VMBus") 1006. Parent partitions 1002 execute a Virtualization Service Provider ("VSP") 1007, which connects to a VMBus 1006 and handles device access requests from one or more child partitions 1003. Generally, a VSP 1007 runs within a parent partition 1002 or other partition that owns a hardware device, such as disk storage 1004. A VSP 1007 may communicate with a device driver, and act as a multiplexer for offering hardware services. Child partition 1003 virtual devices execute a Virtualization Service Client ("VSC") 1008, which redirects requests to one or more VSPs 1007 in a parent partition 1002 via a VMBus 1006. Generally, a VSC 1008 consumes a service.

There may be a VSP/VSC pair per device type. A device protocol may be specific to a device type, but generally operating system agnostic. Microsoft-provided VSP/VSC pairs include pairs for storage, network, video input, and Universal Serial Bus ("USB") uses.

As described below in additional detain, VSP/VSC pairs for storage and networking are used. As such Hyper-V architectures of FIGS. 10 and 11 and VSP/VSC pairs are well known, they are not described in unnecessary detail herein for purposes of clarity.

Figure 12:
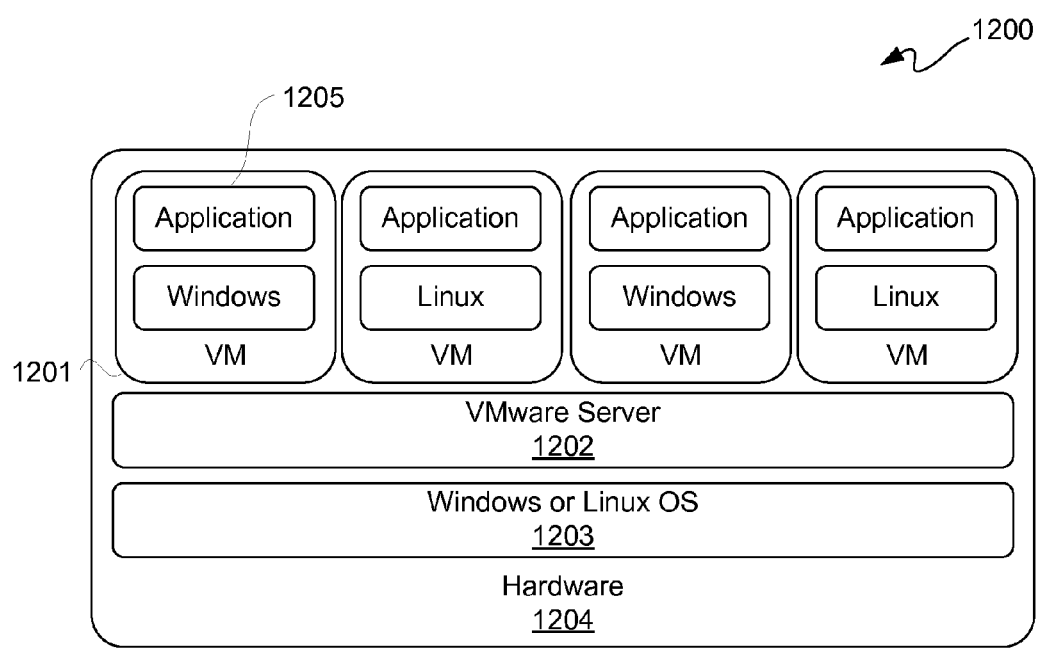
FIG. 12 is a block diagram depicting an exemplary embodiment of a conventional virtual machine server architecture.

FIG. 12 is a block diagram depicting an exemplary embodiment of a conventional VM server architecture 1200. More particularly, VM server architecture 1200 is for a VMware Server, available from VMware, Inc., of Palo Alto, Calif., which partitions a physical server into multiple virtual machines 1201.

Generally, a VMware Server 1202 is a layer that exists between an operating system ("OS") 1203 and virtual machines 1201. An OS, such as Windows or Linux, runs on a hardware platform 1204, such as a server motherboard. Thus, a VMware Server installs and runs as an application on top of a host Windows or Linux operating system.

A thin virtualization layer partitions a physical server to allow multiple virtual machines 1201 to be run simultaneously on such a single physical server. Computing resources of such a physical server may be treated as a uniform pool of resources that may be allocated to such virtual machines 1201 in a controlled manner. A VMware Server 1202 isolates each virtual machine 1201 from its host and other virtual machines 1201, which leaves each operating virtual machine 1201 unaffected if another virtual machine 1201 in the group were to crash or experience a cyber-attack.

Moreover, data does not leak across virtual machines 1201, and applications 1205 of such virtual machines 1201 may communicate over configured network connections. A VMware Server 1202 encapsulates a virtual machine environment as a set of files, which may be backed-up, moved, and/or copied.

Having this context borne in mind, the following descriptions of embodiments of a kernel mode, a driver stack, and a software flow, among others, should be more clearly understood.

Figure 13:
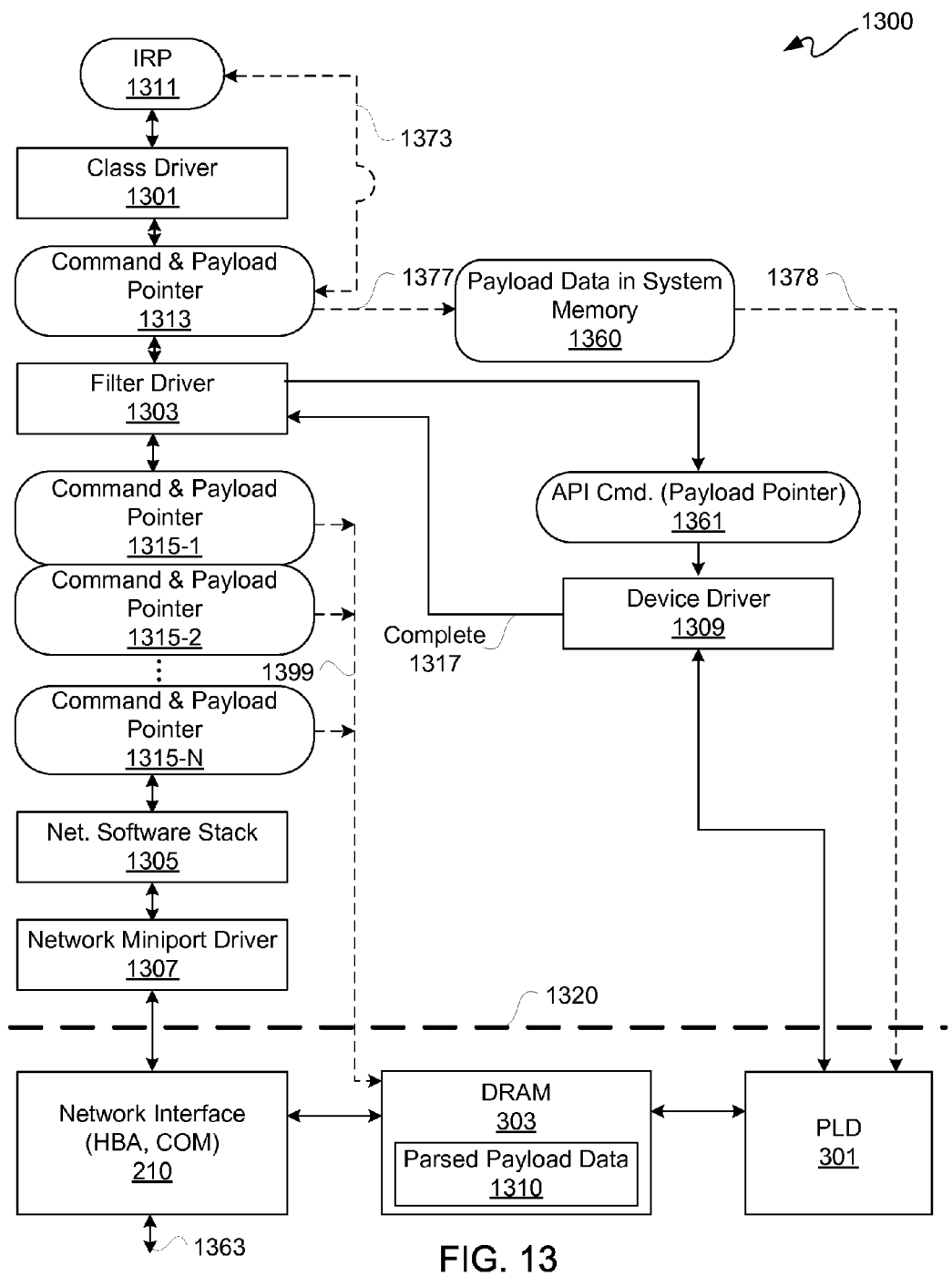
FIG. 13 is a block/flow diagram depicting an exemplary embodiment of a kernel-mode flow for the accelerator system of FIG. 3.

FIG. 13 is a block/flow diagram depicting an exemplary embodiment of a kernel-mode flow 1300 for accelerator system 300 of FIG. 3. Dashed line 1320 indicates a hardware/software partition. Dashed line 1320 may indicate a bus, such as a PCIe bus 411 as previously described with reference to FIG. 4. Above dashed line 1320 is kernel-mode flow 1300. Below dashed line 1320 is a block diagram representing accelerator system 300 of FIG. 3. It should be understood that this representation of such accelerator system 300 is simplified in order to more clearly understand kernel-mode flow 1300.

An IRP 1311 is received by class driver 1301. A general-purpose processor, such as CPU 115 as previously described with reference to FIG. 2 for example, may execute a user application in an application mode causing such user application to provide one or more IRPs, such as IRP 1311, to a class driver 1301 in a kernel mode.

In kernel-mode flow 1300, in addition to class driver 1301, there is a filter driver 1303, a network software stack 1305, a network miniport driver 1307, and a device driver 1309. Device driver 1309 may follow a framework for device drivers introduced by Microsoft, known as a Windows Driver Model ("WDM"). Within such WDM framework, there are device function drivers, including class drivers and miniport drivers. Further within such WDM framework, there are bus drivers and optional filter drivers. An upper-level filter driver is located above a primary driver for a device, such as a class driver, while a lower-level filter driver is located below such class driver and above a bus driver. Thus, filter driver 1303 is a lower-level filter driver.

It should be understood that filter driver 1303 and device driver 1309 are not provided by Microsoft; however, filter driver 1303 and device driver 1309 are written to work within Microsoft's WDM framework. Filter driver 1303 and device driver 1309 are written to support accelerator system 300.

In contrast, class driver 1301 and network software stack 1305 are provided by Microsoft. Furthermore, network miniport driver 1307 may be provided by an independent hardware vendor ("IHV") of network interface 210. Accordingly for purposes of clarity and not limitation, generally only inter-workings of filter driver 1303 and device driver 1309 are described below in additional detail.

Even though the following description is in terms of a WDM framework for purposes of clarity and not limitation, it should be understood that other driver models may be used for operating with operating systems other than a Windows-based operating system. Along those lines, it should be understood that an operating system, such as Linux, may have similar software components to those of a WDM framework as described herein. Thus, filter driver 1303 and device driver 1309 are applicable to operating systems other than Windows. Moreover, drivers 1303 and 1309 may be implemented as virtual drivers, such as in a virtual driver model, and thus are applicable to virtual operating systems.

Again, it should be understood that a secure data storage application is described for purposes of clarity and not limitation, as other applications involving accelerated data processing may be used. So even though a network software stack 1305 and a network miniport driver 1307 are described, it should be understood that another type of stack driver and/or another type of miniport driver may be used in other applications. For example, if storage devices were locally coupled, namely not coupled through network interface 210, then network software stack 1305 would be a storage software stack 1305, and network miniport driver 1307 would be a storage miniport driver 1307. However, for FIG. 13 it shall be assumed that a network interface is used for communicating with multiple storage devices, such as in cloud storage for example, for purposes of clarity and not limitation.

For this secure data storage application, data is encrypted and stored redundantly in multiple locations so that it may only be recovered by an authorized user, yet such data may still be recovered if one or more of the storage devices is or becomes inoperable. Other details regarding such secure data storage application may be found in U.S. Patent Publication US20100299313A1 and in the above-referenced provisional patent application.

For this secure data storage application, when a user application issues a write or read, such as to write or read a file of information, it issues such command as if such data file was stored locally on a storage device, such as a hard disk drive for example, of a host system hosting such user application. Thus, IRP 1311 from outward appearances may be a write or read for a data file stored locally on a hard disk drive for example. However, such file data is encrypted, parsed, split, stored within, and/or recombined from multiple storage devices, such as multiple hard disk drives, and such multiple storage devices may be at locations remote with respect to a computer system executing such user application. Even though the example of a hard disk drive is used, it should be understood that any of a variety of storage devices, many of which are listed elsewhere herein, may be used.

For a write command of a data file, IRP 1311 may include payload data 1360. Class driver 1301 passes an SRB 1313 responsive to IRP 1311 to filter driver 1303. Such SRB may include a command and a payload pointer for such write command. Filter driver 1303 provides a command 1361 responsive to IRP 1311, or more particularly SRB 1313, to device driver 1309. Command 1361, which may be an Application Program Interface ("API") command, may include a "system" payload pointer pointing to payload data 1360, such as payload data in system memory for example. Such system payload pointer indicates an address where a host system believes such data file, namely payload data 1360, is located. Filter driver 1303 may pass such API command 1361 to device driver 1309, where such API command 1361 includes a system payload pointer pointing to payload data 1360. Device driver 1309 in communication with PLD 301 invokes an API responsive to such API command 1361 to obtain and processes payload data 1360 responsive to command 1361. Such payload data 1360 is obtained by PLD 301 using such system payload pointer as generally indicated by dashed lines 1377 and 1378.

Such payload data 1360 may be parsed, split, and/or separated into two or more parts or portions by PLD 301, and such parts or portions may be encrypted by PLD 301 for storing in local DRAM 303 as parsed payload data 1310. Once parsed payload data 1310 is written into local DRAM 303, PLD 301 provides a notice of completion signal to device driver 1309, and device driver 1309 provides such complete signal 1317 to filter driver 1303.

To recapitulate, IRP 1311 may represent a single read or write command. Class driver 1301 may pass IRP 1311 to filter driver 1303 as an SRB 1313. Alternatively, IRP 1311 may be intercepted by filter driver 1303. Such SRB 1313 includes such single read or write command, and such single read or write command includes a system payload pointer. Such system payload pointer points to or indicates where a host system believes such payload is locally stored.

Continuing the example of IRP 1311 representing a single write command, filter driver 1303 generates multiple write commands with payload pointers, namely commands 1315-1 through 1315-N, for N a positive integer greater than one (collectively and singly "commands 1315"). Generally, such multiple commands 1315 are passed from filter driver 1303 to network software stack 1305, and network software stack 1305 passes such commands 1315 to network miniport driver 1307. Network miniport driver 1307 provides such commands 1315 to network interface 210.

It should be understood that filter driver 1303 in generating payload pointers associated with commands 1315 effectively replaces a system payload pointer with local payload pointers for pointing to local DRAM 303, as generally indicated by dashed line 1399. Such local payload pointers are in read commands 1315 for reading local DRAM 303.

In this example application, network interface 210 uses such local payload pointers to read out parsed payload data 1310, namely to read out encrypted data blocks. It should be understood that for this secure data storage application, redundancy information may be appended to payload data 1360, and thus parsed payload data 1310 may be significantly larger than payload data 1360. Such redundancy information may be appended to the payload data to allow for restoration of such payload data using fewer than all of the portions of such payload data, and such redundancy data may be stored in different remotely located storage devices. Furthermore, as described above, such payload data 1360, as well as such redundancy data thereof, may be parsed, split, and/or separated into smaller parts or portions. Filter driver 1303 when generating local payload pointers for commands 1315 accounts for payload size information in each command, as such pointers have to account for payload size after processing by PLD 301.

It should further be understood that filter driver 1303 in generating commands 1315 accounts for storing parsed payload data 1310 in multiple storage devices, one or more of which may be for redundancy, using address information provided by a user application. More particularly, with reference to FIG. 15, such user application in an embodiment is an RPU administrative configuration application 1504, and such user application provides addressing information for both reads and writes. Such addresses or pointers may be in one or more generated SRBs, as described below in additional detail.

Network interface 210 may be coupled to a network 1363 as generally indicated for communication with such multiple storage devices. Network interface 210 may be a host bus adapter/communications ("HBA/COM") chip. As network interface 210 receives each storage command associated with commands 1315 having traveled down a software stack into a miniport driver, network interface 210 performs a DMA operation to read parsed payload data 1310 using local payload pointers in commands 1315. Such retrieved parsed payload data 1310 may be combined with command information in such storage commands to provide packets, such as SRBs mentioned above and described below, and such assembled packets may be transferred over a network to multiple storage devices.

If IRP 1311 were for a read operation, namely a read command, then such IRP 1311 would not include payload data. A user application may issue such a read command, namely a single read command, as if the data to be read, such as a data file, were located on a local storage device, such as a local disk drive.

IRP 1311 is provided to class driver 1301, and class driver 1301 passes IRP 1311 to filter driver 1303 as an SRB 1313. Alternatively, IRP 1311 may be intercepted by filter driver 1303, as generally indicated by dashed line 1373.

Filter driver 1303 generates multiple read commands 1315 responsive to IRP 1311 or SRB 1313. Such read commands 1315 include address information for retrieval of data stored on multiple storage devices in a network cloud. Such commands 1315 are passed down through network software stack 1305 to network miniport driver 1307. From such multiple storage devices, network interface 210 obtains data blocks, and network interface 210 asserts a DMA command for passing such data blocks to local DRAM 303 for writing thereto as parsed payload data 1310.

After parsed payload data 1310 is written back into local DRAM 303 via network interface 210, PLD 301 provides a notice of completion signal to device driver 1309, and such notice of completion signal 1317 is provided to filter driver 1303. Filter driver 1303 provides a read command 1361 to device driver 1309 in response to IRP 1311 or SRB 1313. Device driver 1309 provides read command 1361 to PLD 301.

In response to read command 1361, PLD 301 reverse processes parsed payload data 1310, such as for example decrypts data and then restores the data using the restore functions of secure parser 500 to provide payload data 1360 as a single data file or single data block, such as originally received for example. As described herein, data may be restored according to any of the techniques described in U.S. Patent Publication US20100299313A1, as previously described.

PLD 301 transfers such single data block as payload data 1360 in response to such IRP 1311 from a user application. In an embodiment, PLD 301 uses a DMA transfer into system memory 116 to write payload data 1360 therein. PLD 301 asserts a notice of completion signal 1317 to device driver 1309 for filter driver 1303 to indicate such writing of payload data 1360 to system memory 116. In response to notice of completion signal 1317, filter driver 1303 indicates to a user application that such read request has been completed.

Accordingly, it should be understood that such secure data storage application as described may operate transparently with respect to a user application. In other words, a user application may issue read and write requests as though requesting operations to be performed on a local storage device without knowledge that such above-described operations are performed for providing parsed payload data 1310 for example. It should further be appreciated that because of parsing and/or redundancy, parsed payload data 1310 may be significantly larger than payload data 1360, and thus data transferred over network interface 210 may be significantly more voluminous than payload data 1360, namely data seen by a user application.

Furthermore, locally temporarily stored or maintained data may be processed in an accelerated manner by PLD 301 by instantiating one or more data processing algorithms in programmable logic, where such algorithms are effectively replicated in circuitry. Along those lines, only original payload data 1360 for a write operation or process data to restore such original payload data 1360 for a read operation is transferred over system PCIe bus 411, such as for going from or to system memory 116. Thus the data handling and/or data processing burden on one or more motherboard system resources as previously described herein is significantly reduced. Such burden reduction may enhance overall operational efficiency of a host system.

Figure 14:
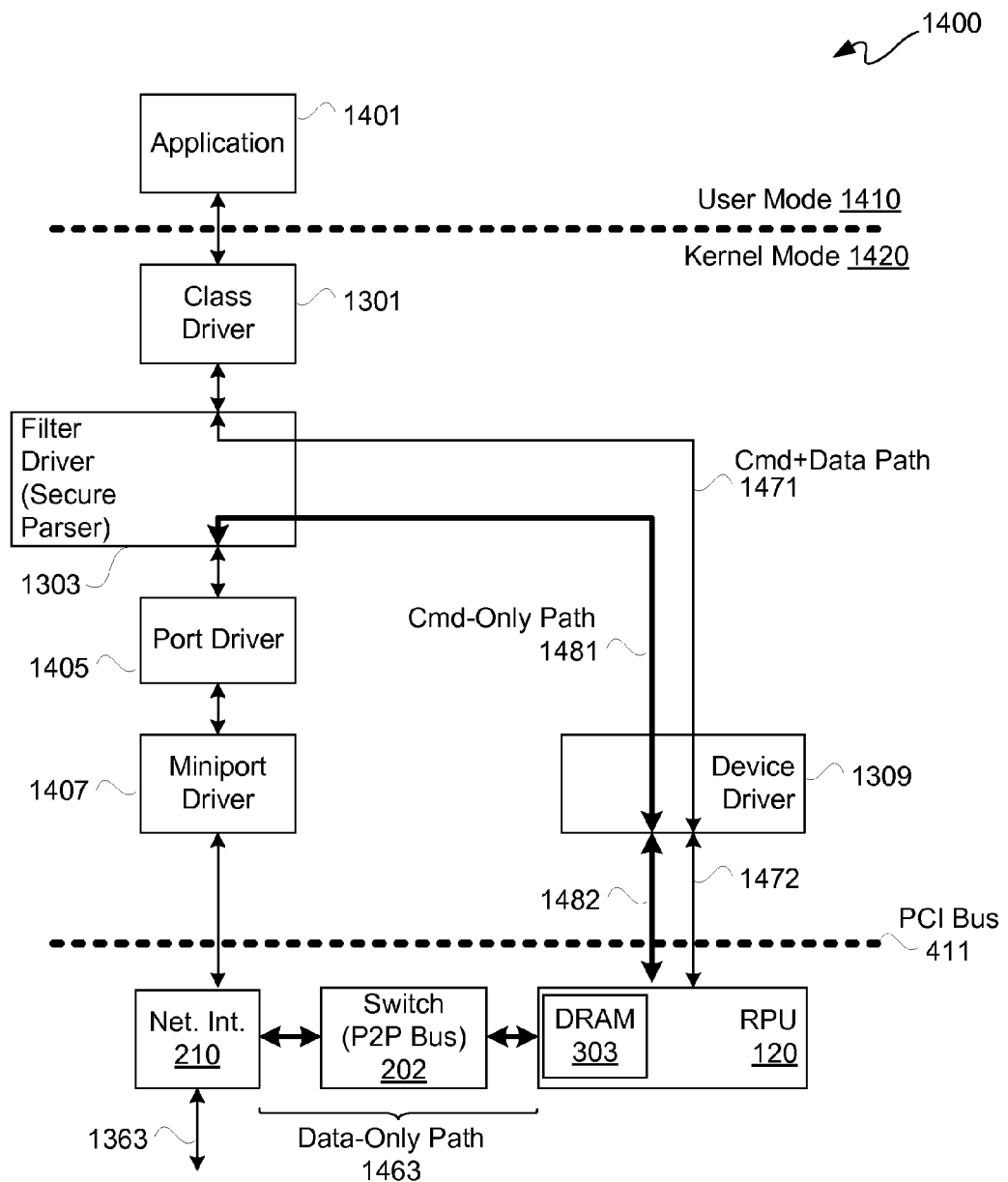
FIG. 14 is a block/flow diagram depicting an exemplary embodiment of a driver stack for the kernel-mode of FIG. 13 and the accelerator system of FIG. 3.

FIG. 14 is a block/flow diagram depicting an exemplary embodiment of a driver stack 1400 for kernel mode flow 1300 of FIG. 13 and accelerator system 300 of FIG. 3. In FIG. 14, a user mode 1410 is delineated from a kernel mode 1420, and kernel mode 1420 is delineated from a hardware section, as indicated by PCIe bus 1411. Accordingly, it should be appreciated that kernel mode 1420 corresponds to kernel mode flow 1300 of FIG. 13.

Application 1401 is in communication with class driver 1301, and class driver 1301 is in communication with filter driver 1303. Again for purposes of clarity and not limitation, the example of a secure data storage application is used, and accordingly filter driver 1303 is parenthetically indicated as a secure parser. Filter driver 1303 is in communication with device driver 1309 and port driver 1405. Port driver 1405 is in communication with miniport driver 1407. Port driver 1405 and miniport driver 1407 respectively correspond to software stack 1305 and miniport driver 1307. Miniport driver 1407 is in communication with network interface 210, and device driver 1309 is in communication with RPU 120.

Application 1401, which is a user application, communicates with class driver 1301. Class driver 1301 communicates with filter driver 1303. Class driver 1301 may pass what may be termed "plaintext" to filter driver 1303. Filter driver 1303 separates a control path from a data path, as described below in additional detail.

PCIe bus 411 is the relative location at which software components transition to hardware blocks. Accelerator system 300 of FIG. 3 is generally represented by network interface 210 coupled to switch 202, and switch 202 is coupled to RPU 120. Accordingly, RPU 120 includes DRAM 303. Switch 202 may be thought of as a point-to-point bus ("P2P bus"). Communication between network interface 210 and RPU 120 through switch 202 may be generally thought of as a data-only path 1463.

Filter driver 1303 is in communication with device driver 1309 via a command and data path 1471. Device driver 1309 is in communication with RPU 120 via command and data path 1472. Command and data paths 1471 and 1472 may be referred to as "cleartext" paths. In contrast, data-only path 1463 is an encrypted only data path, namely a "ciphertext" path. RPU 120 is further in communication with device drivers 1309 via command-only path 1482. Device driver 1309 is further in communication with filter driver 1303 via command-only path 1481. In other words, only commands are passed via paths 1481 and 1482.

Command-only paths 1481 and 1482 are cleartext paths. Moreover, commands provided via command-only paths 1481 and 1482 are parsed out commands from a single command as previously described with reference to FIG. 13. In other words, commands provided via command-only paths 1481 and 1482 may be thought of as "N shares" corresponding to N parts or portions of data stored in DRAM 303. Thus, filter driver 1303 may provide N shares of commands via command-only path 1481 for device driver 1309, and device driver 1309 may pass such N shares of commands to RPU 120 via command-only path 1482. N shares of commands may be passed from filter driver 1303 to port driver 1405, as previously described with reference to FIG. 13.

Figure 15:
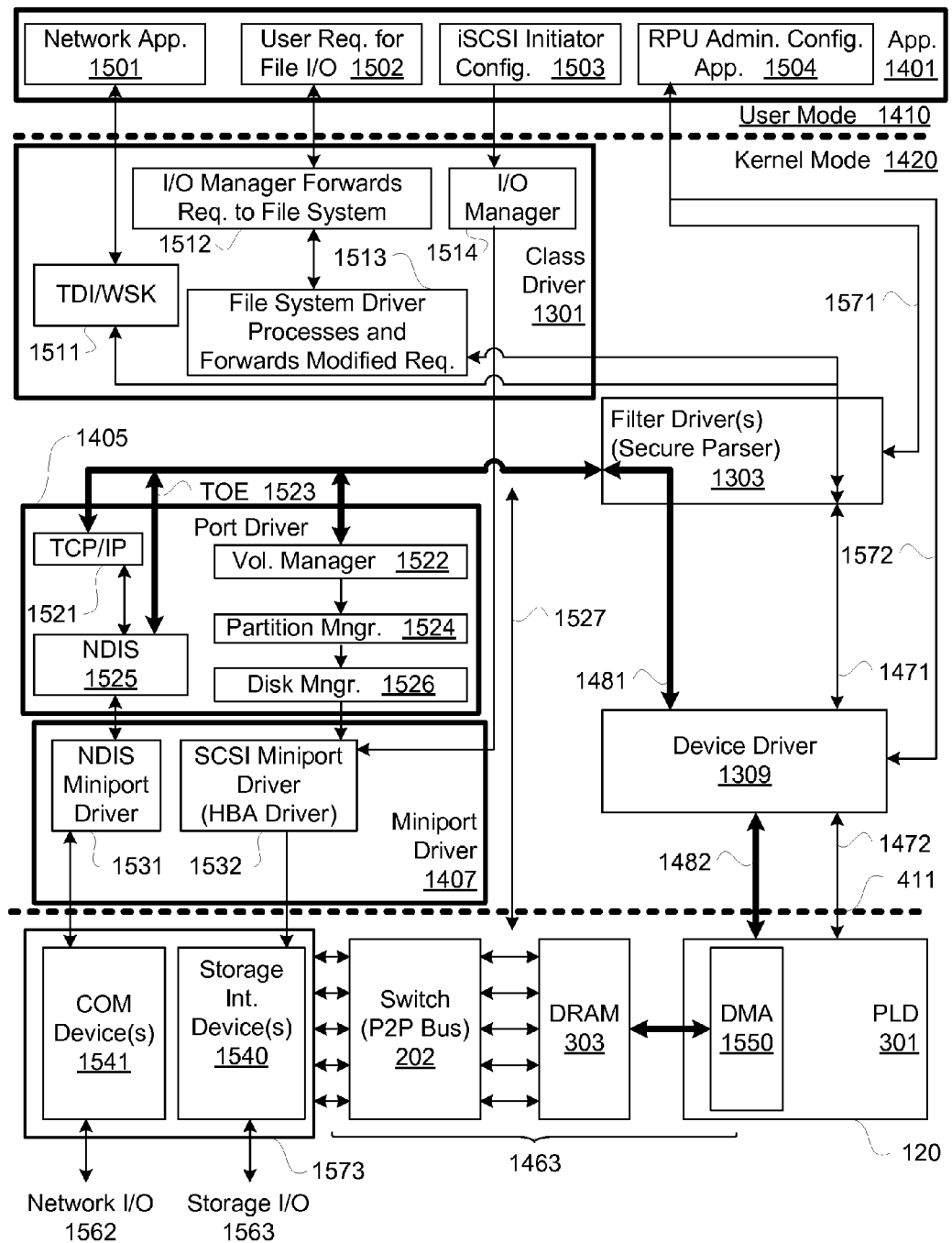
FIG. 15 is a block/flow diagram depicting an exemplary embodiment of a software flow for the driver stack of FIG. 14 for the accelerator system of FIG. 3.

FIG. 15 is a block/flow diagram depicting an exemplary embodiment of a software flow for driver stack 1400 of FIG. 14 for accelerator system 300 of FIG. 3. In FIG. 15, application 1401 of user mode 1410 is broken out into four separate software components or applications 1501 through 1504. Network application 1501 allows a user application to transfer data over a network using facilities of accelerator system 300. User request for file I/O 1502 allows a user application to transfer data to a type of storage media using facilities of accelerator system 300. ISCSI initiator configuration application 1503 is responsible for designating a correct storage media to use and initiating a data transfer using an iSCSI storage protocol. RPU administrator configuration application 1504 is responsible for setting up and initializing filter driver 1303, device driver 1309, and hardware of accelerator system 300.

In kernel mode 1420, class driver 1301 is broken out into four parts provided by Microsoft, namely a transport driver interface/winsock kernel ("TDI/WSK") module 1511, and I/O manager forwards requests to file system module 1512, a file system driver processes and forwards modified request module 1513, and an I/O manager 1514. Generally, commands and data to be transferred over network go through module 1511, and commands and data going to or from storage media go through modules 1512 and 1513. Commands to configure and initialize an iSCSI initiator go through I/O manager 1514. Other known details regarding class driver 1301 are not provided for purposes of clarity and not limitation.

Commands and data from class driver 1301 are provided as cleartext to one or more filter drivers 1303. Commands to set up and initialize filter driver 1303 and device driver 1309 are respectively provided via paths 1571 and 1572. Commands to set up and initialize RPU 120 are provided via path 1572 to device driver 1309 for RPU 120 via PCIe bus 411 using command and data path 1472.

One or more filter drivers 1303 are used to separate command information from data so such separate types of information may take separate paths through software and hardware, as previously described. One or more filter drivers 1303 are in communication with port driver 1405 via command-only path 1481.

Port driver 1405 may generally be separated out into two software stacks of Microsoft software components, namely one for network commands and another one for storage device commands. The stack for network commands follows a TCP/IP protocol, and the stack for storage device commands follows a SCSI protocol. Port driver 1405 for network commands includes a TCP/IP module 1521, a TCP offload engine bus 1523, and a network driver interface specification ("NDIS") module 1525. Port driver 1405 for storage commands includes volume manager 1522, partition manager 1524, and disk manager 1526. Other known details regarding port driver 1405 are not provided for purposes of clarity and not limitation.

Miniport driver 1407, which may be supplied by a vendor of a communication device or storage device depending on whether such miniport driver is for a network interface or a storage device interface, likewise may be separated out as was port driver 1405. A software stack for network commands of port driver 1405 is in communication with an NDIS miniport driver 1531 of miniport driver 1407. More particularly, NDIS miniport driver 1531 is in communication with NDIS module 1525. NDIS miniport driver 1531 is used to manage a network interface, such as a NIC, including sending and receiving data through such a NIC.

A software stack for storage device commands of port driver 1405 is in communication with a SCSI miniport driver 1532 of miniport driver 1407. SCSI miniport driver or HBA driver 1532 manages an HBA for SCSI commands, data and processing. SCSI miniport driver 1532 is in communication with disk manager 1526 and I/O manager 1514.

Both an NDIS miniport driver 1531 and a SCSI miniport driver 1532 may be used as supplied by an IHV of a network interface, such as a NIC. It should be understood that miniport drivers 1531 and 1532 both communicate with a hardware network interface device. Other known details regarding miniport driver 1407 are not provided for purposes of clarity and not limitation.

In FIG. 15, such hardware network interface device is shown as separate boxes depending on whether commands are for network traffic or storage traffic. For network traffic, NDIS miniport driver 1531 is in communication with one or more COM devices 1541. Any of a variety of COM devices 1541 may be managed by NDIS miniport driver 1531. Examples of such COM devices 1541 include without limitation an Ethernet NIC, a WiFi device, a WiMax device, an iWARP device, a WSD device, an RNDIS device, and a TOE device. For storage traffic, SCSI miniport driver 1532 is in communication with one or more storage interface devices 1540. Any of a variety of storage interface devices 1540 may be managed by SCSI miniport driver 1532. Examples of storage interface devices 1540 include without limitation an iSCSI device, a SCSI device, and an FCoE device.

It should be understood that a single IC may be used to provide both a network interface and a storage device interface covering one or more protocols of each of such interfaces. Thus even though two separate boxes are illustratively depicted for one or more COM devices 1541 and one or more storage interface devices 1540, such two separate boxes may be implemented in a single IC 1573. Such a single IC 1573 may have network I/O interface 1562 and storage I/O interface 1563.

PLD 301 of RPU 120 may include a DMA module 1550 for communication with DRAM 303. Again communication between PLD 301 and IC 1573 with respect to data is via data-only path 1463. Furthermore, as previously indicated, there may be some address translation or remapping of an SRB with a data buffer to point to DRAM 303, as generally indicated by line 1527 spanning port driver 1405 and miniport driver 1407 as well as pointing to the interface between switch 202 and DRAM 303. Additionally, such remapping at 1527 may involve a remap of cleartext logical unit number ("LUN") and logical block addressing ("LBA") SCSI parameters.

Figure 16:
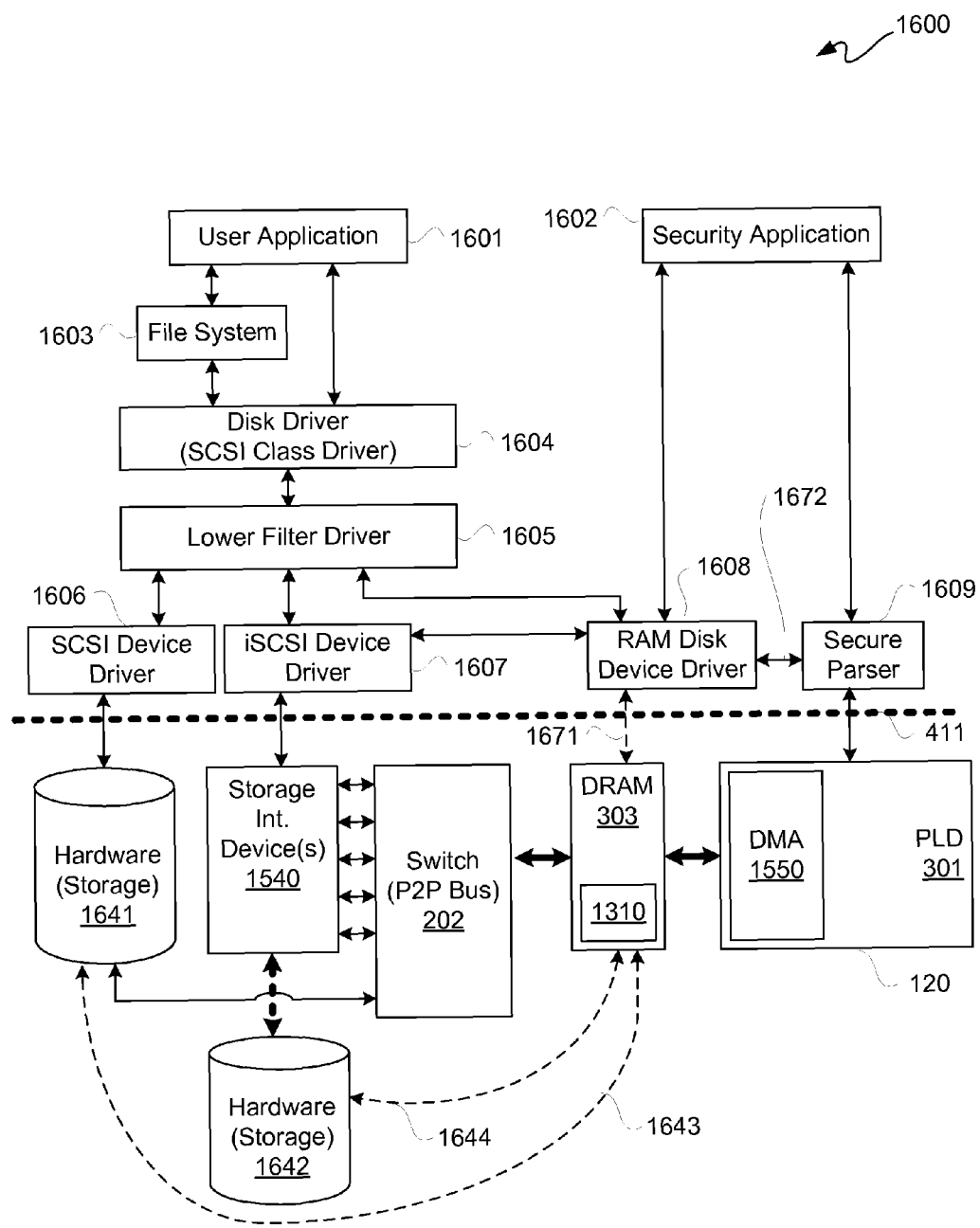
FIG. 16 is a block diagram depicting an exemplary embodiment of a storage area network ("SAN").

FIG. 16 is a block diagram depicting an exemplary embodiment of a storage area network ("SAN") 1600 for accelerator system 300 of FIG. 3. However, in this embodiment DRAM 303 is used as a RAM disk.

User application 1601 may be in communication with a file system 1603 and a disk driver 1604. For purposes of clarity by way of example and not limitation, it shall be assumed that a SCSI protocol is used; however, other types of storage protocols may be used. Accordingly, disk driver 1604 may be a SCSI class driver. File system 1603 is in communication with disk driver 1604. It should be understood that file system 1603 and disk driver 1604 may be provided by Microsoft, and user application 1601 may be any compatible user application. Accordingly, user application 1601, file system 1603, and disk driver 1604 are not described in unnecessary detail for purposes of clarity and not limitation.

Lower filter driver 1605 is in communication with a RAM disk device driver 1608, disk driver 1604, SCSI device driver 1606, and iSCSI device driver 1607. RAM disk device driver 1608 is additionally in communication with secure parser 1609, iSCSI device driver 1607, and a security application 1602. Secure parser 1609 is in communication with security application 1602 and RPU 120. Security application 1602 may be application 1401 as previously described with reference to FIGS. 14 and 15.

Lower filter driver 1605 may receive an SRB from disk driver 1604, as previously described. Lower filter driver 1605 may monitor drivers 1606 through 1608. SCSI device driver 1606 may be in communication with local hardware storage 1641, such as one or more storage devices using a SCSI protocol. iSCSI device driver 1606 may be in communication with one or more storage interface devices 1540, as previously described with reference to FIG. 15. One or more storage interface devices 1540 may be for communicating with one or more remotely located hardware storage 1642, such as one or more storage devices in a network cloud. It should be understood that device drivers 1606 and 1607 may be obtained from manufacturers of storage devices.

Secure parser 1609, RAM disk device driver 1608, and lower filter driver 1605 in combination may be operate as previously described with reference to filter driver 1303 and device driver 1309, but with the addition of a RAM disk operation of DRAM 303 as generally indicated by a dashed line 1671 extending between RAM disk device driver 1608 and DRAM 303. Additionally, RAM disk device driver 1608 may communicate with iSCSI device driver 1607 via an M-to-1/1-to-M ("M: 1/1: M") SCSI command bus 1672.

Effectively, RAM disk device driver 1608 is configured by security Application 1602 to treat DRAM 303 like a local RAM disk drive. Thus, a read or write request from user application 1601 may be provided to RAM disk device driver 1608 for writing to DRAM 303. As previously described, such read or write request may involve one or more of encrypting, parsing, splitting, decrypting, recombining, or restoring data. Thus for example, parsed payload data 1310 in DRAM 303 may be provided to or be obtained from hardware storage 1641 and/or hardware storage 1642 as generally indicated by dashed lines 1643 and 1644, respectively. Other details regarding operation of SAN 1600 were previously described elsewhere herein, and thus are not repeated for purposes of clarity and not limitation.

Figure 17:
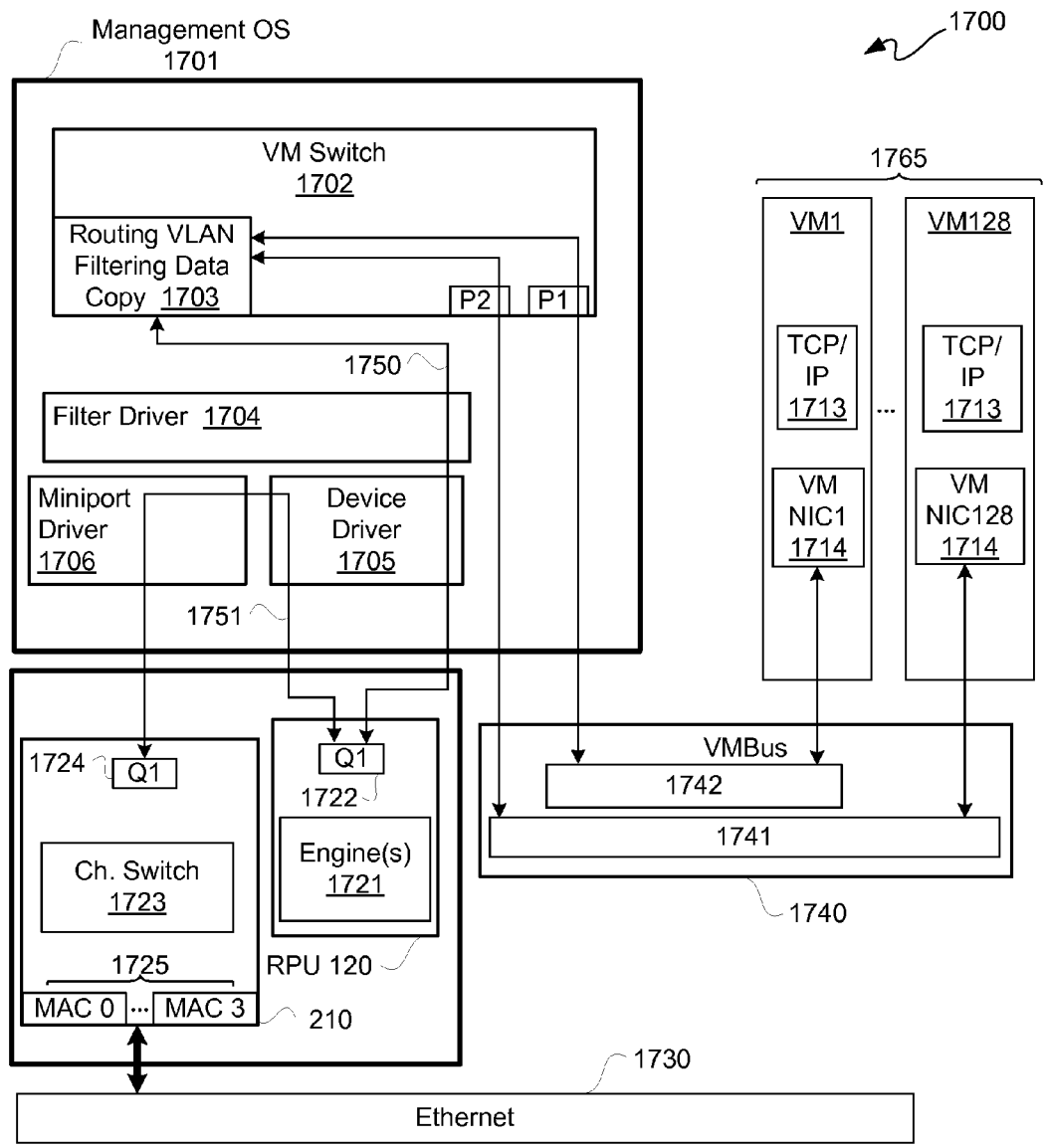
FIGS. 17-19 are block diagrams depicting respective exemplary embodiments of network input/output systems for hypervisor-based virtualization.
Figure 18:
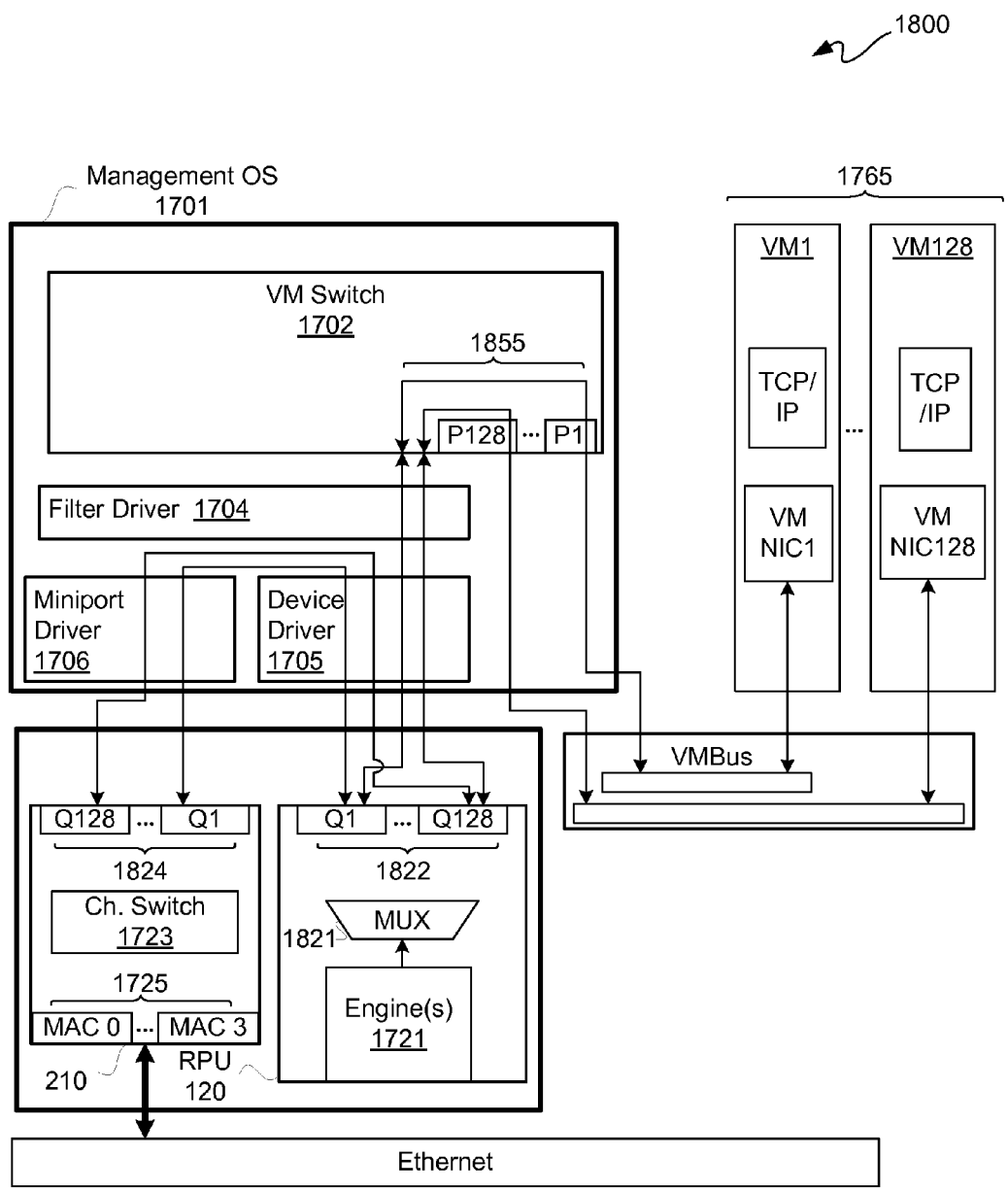
Figure 19:
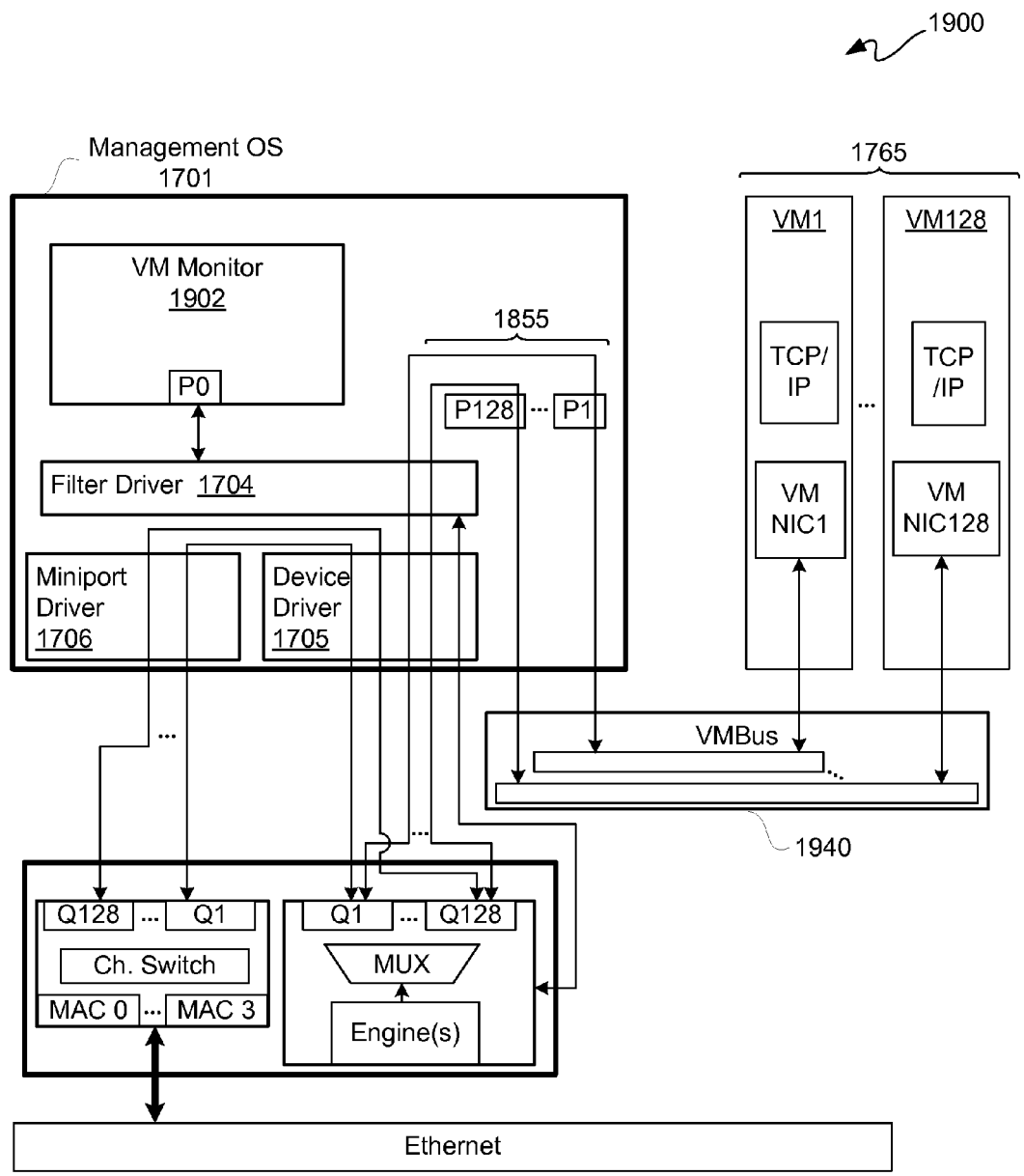

FIGS. 17-19 are block diagrams depicting respective exemplary embodiments of network I/O systems for hypervisor-based virtualization. In FIG. 17, network I/O system 1700 is for a virtual operating system ("OS"). A management OS layer 1701 may have running thereon VM switch 1702, filter driver 1704, miniport driver 1706, and device driver 1705. Management OS 1701 represents a parent partition, as previously described with reference to a hypervisor virtualization.

VM switch 1702, such as from Microsoft, may include a routing virtual LAN ("VLAN") filtering data copy module 1703, and multiple ports, such as port 1 ("P1") and port 2 ("P2"). Module 1703 is in communication with VM buses 1742 and 1741 of VM bus module 1740, such as from Microsoft. VM bus module 1740 may be used by VM switch 1702 to switch between different VM network blocks, such as network virtual machines 1765, using VLAN tagging provided by module 1703.

Multiple network virtual machines 1765, namely in this exemplary embodiment 128 network virtual machines VM1 through VM128, are coupled to VM bussing of VM bus module 1740. Each network virtual machine, such as VM1 for example, includes a respective TCP/IP module 1713 and a respective VM network interface (e.g., "NIC1" for VM1 and "NIC128" for VM128). VM switch 1702, VM bus module 1740, and network virtual machines are known, and thus are not described in unnecessary detail herein. It should be understood that 128 network virtual machines have switched access to two VM buses, namely VM buses 1741 and 1742, for access to ports P1 and P2, respectively.

Filter driver 1704 is a virtualization of filter driver 1303 of FIG. 13, and device driver 1705 is of virtualization device driver 1309 of FIG. 13. Miniport driver 1706 is a virtualization of a network miniport driver, such as miniport driver 1407 of FIG. 14. As generally indicated by line 1750, filter driver 1704 is in communication with module 1703, and filter driver is in communication with device driver 1705. Furthermore, as generally indicated by line 1750, device driver 1705 is in communication with a queue 1722 of RPU 120. Thus, commands and data may be passed to and from queue 1722 to module 1703.

RPU 120 may have one or more encryption and decryption ("cryptographic") engines 1721 therein, including without limitation instantiated therein in programmable logic, coupled to queue 1722. As generally indicated by line 1751, queue 1722 of RPU 120 is in communication with device driver 1705, and device driver 1705 is in communication with filter driver 1704. Furthermore, as generally indicated by line 1751, filter driver 1704 is in communication with miniport driver 1706, and miniport driver 1706 is in communication with queue 1724 of network interface 210. Thus, commands and data may be passed to and from queues 1722 and 1724.

In addition to queue 1724, network interface 210 includes channel switch 1723 and a plurality of media access controllers 1725. For purposes of clarity, the terms "media access control" and "medium access controller" are used interchangeably herein, and either or both are referred to as a "MAC." Channel switch 1723 is for coupling queue 1724 to a selected MAC of MACs 1725 for communication via Ethernet 1730. Even though four MACs 1725 are illustratively depicted, fewer or more MACs 1725 may be used.

For a secure data storage application, data to and from VM switch 1702 and queue 1722 may be unencrypted; however, data from queue 1722 to queue 1724 generally would be encrypted by one or more of cryptographic engines 1721 for a transmit direction. In a receive direction, encrypted data from queue 1724 provided to queue 1722 would be decrypted by one or more cryptographic engines 1721 for providing to VM switch 1702.

In FIG. 18, network I/O system 1800 is similar to network I/O system 1700 of FIG. 17, and thus generally only the differences between the two systems are described for purposes of clarity and not limitation. In network I/O system 1800, module 1703 is omitted.

VM switch 1702 has P1 through P128 ports of ports 1855 in communication with Q1 through Q128 queues of queues 1822 of RPU 120. Thus, ports 1855 correspond to network virtual machines 1765, and ports 1855 correspond to queues 1822. Furthermore, queues 1822 correspond to queues 1824.

Ports 1855 are in communication with queues 1822 through filter driver 1704 and device driver 1705. In other words, ports 1855 are in communication with filter driver 1704 through 128 paths, filter driver 1704 is in communication with device driver 1705 through 128 paths, and device driver 1705 is in communication with queues 1822 through 128 paths.

RPU 120 includes multiplexing circuitry 1821 for selectively coupling one or more cryptographic engines 1721 to a selected queue of queues 1822.

Queues 1822 are respectively in communication with queues 1824 of network interface 210 through device driver 1705 and miniport driver 1706. More particularly, Q1 through Q128 of queues 1822 are in communication with device driver 1705 through 128 paths; device driver 1705 is in communication with miniport driver 1706 through 128 paths; and miniport driver 1706 is in communication with queues 1824 through 128 paths.

Network interface 210 includes Q1 through Q128 queues of queues 1824. One or more of queues 1824 are selectively coupled to a MAC of MACs 1725 via channel switch 1723.

In FIG. 19, network I/O system 1900 is similar to network I/O system 1800 of FIG. 18, and thus generally only the differences between the two systems are described for purposes of clarity and not limitation. In network I/O system 1900, VM switch 1702 is replaced with a VM monitor 1902 having a port P0. Furthermore, VM switch 1702 is omitted, and ports 1855 run on management OS 1701 directly, and not through switch access via a VM switch. Accordingly, VM bus module 1940 may have respective channels for virtually respectively coupling each of ports 1855 to each of virtual machines 1765. VM monitor 1902 is in communication with filter driver 1704 via port P0 for monitoring such driver.

It should be understood that in each of systems 1700 through 1900 cryptographic engines 1721 encrypt and decrypt all data traffic from and to networking VMs 1765, or more particularly to or from a target networking VM 1765. Furthermore, even though an example of 128 VMs was used, it should be understood that fewer or more networking VMs 1765 may be used.

Figure 20:
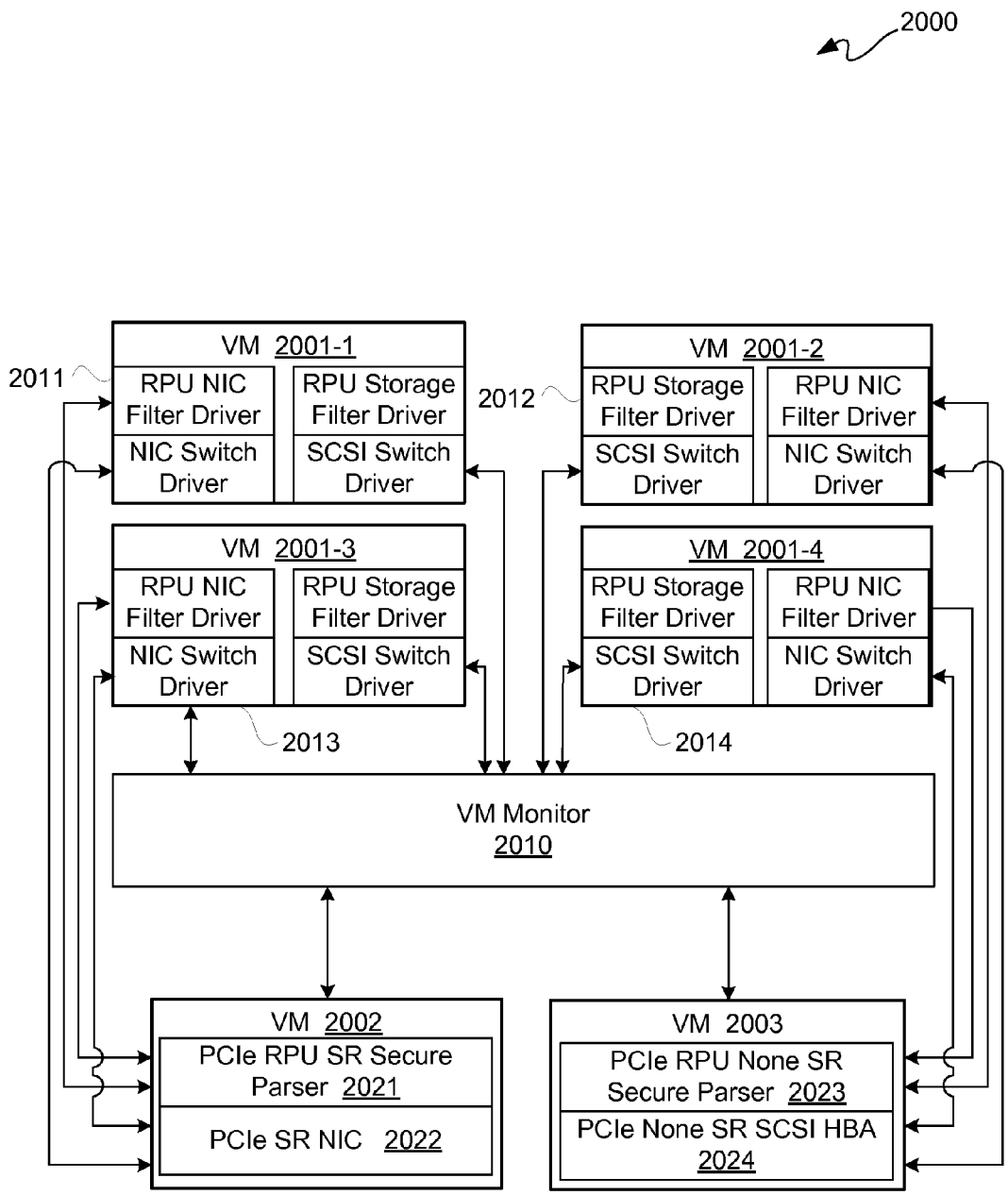
FIG. 20 is a block diagram depicting an exemplary embodiment of a virtual machine ware ("VMware") storage and network interface stack

FIG. 20 is a block diagram depicting an exemplary embodiment of a virtual machine ware ("VMWare") storage and network interface stack 2000. Stack 2000 includes VM's 2001-1 through 2001-4, VMWare VM monitor 2010, VM 2002, and VM 2003. Stack 2000 uses Single Root I/O Virtualization ("SR-IOV").

Each VM 2001-1 through VM 2001-4 respectively includes an RPU NIC filter driver 2011, an RPU storage filter driver 2012, an NIC switch driver 2013, and a SCSI switch driver 2014. SCSI switch drivers 2014 are in communication with VMWare VM monitor 2010. NIC switch driver 2013 of VM 2001-3 is in communication with VMWare VM monitor 2010.

VM 2002 includes a PCIe RPU SR secure parser 2021 and a PCIe SR NIC 2022. VM 2003 includes a PCIe RPU secure parser 2023 without SR and a PCIe SCSI HBA 2024 without SR. VMs 2002 and 2003 are in communication with VMWare VM monitor 2010. NIC switch drivers 2013 of VMs 2001-2 and 2001-4 are in communication with SCSI HBA 2024. RPU NIC filter drivers 2011 of VMs 2001-2 and 2001-4 are in communication with secure parser 2023.

NIC switch drivers 2013 of VMs 2001-1 and 2001-3 are in communication with NIC 2022. RPU NIC filter drivers 2011 of VMs 2001-1 and 2001-3 are in communication with secure parser 2021.

RPU NIC filter drivers 2011 and RPU storage filter drivers 2012 are added to VMs 2001-1 through 2001-4, where such VMs 2001-1 through 2001-4, apart from such drivers 2011 and 2012, are obtained from VMWare, Inc. Secure parsers 2021 and 2023 are added to VMs 2002 and 2003, respectively, where such VMs 2002 and 2003, apart from such parsers 2021 and 2023, are obtained from VMWare, Inc. VMWare VM monitor 2010 is obtained from VMWare, Inc. Drivers 2013 and 2014, as well as an NIC 2022 and SCSI HBA 2024, are obtained from the vendor or manufacturer of an associated NIC and/or SCSI interface. Drivers 2011 and 2012, as well as secure parsers 2021 and 2023, may be virtualizations of filter driver 1303 and device driver 1309 of FIG. 13 for used in a VMware server environment.

Figure 21:
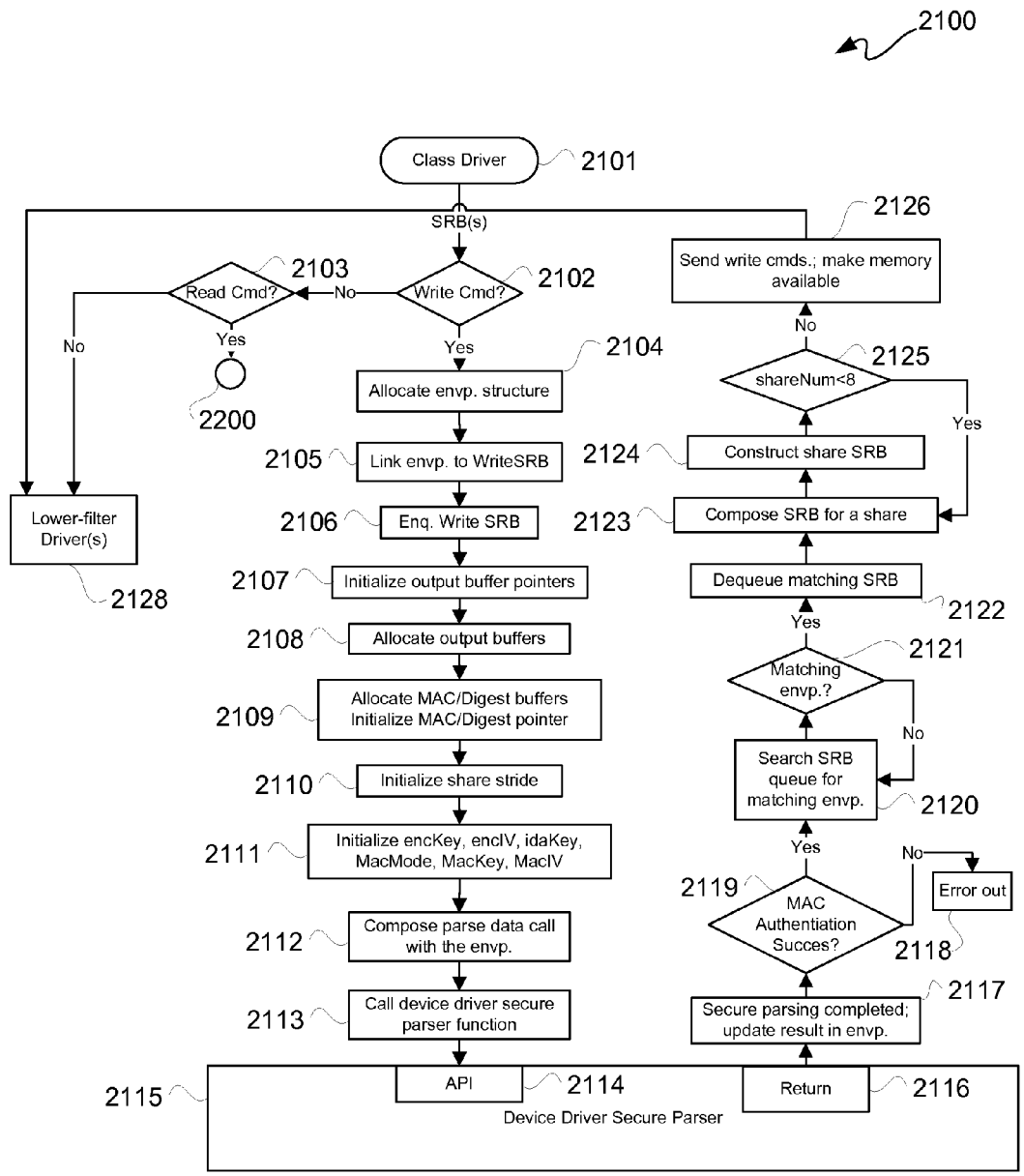
FIG. 21 is a flow diagram depicting an exemplary embodiment of a write through a filter driver flow.

FIG. 21 is a flow diagram depicting an exemplary embodiment of a write through a filter driver flow 2100. Filter driver flow 2100 may be for filter driver 1303 of FIG. 13. As filter driver 1303 communicates with class driver 1301 and device driver 1309, those drivers are mentioned in the following description of filter driver flow 2100. For purposes of clarity and not limitation, filter driver flow 2100 is described further with simultaneous reference to FIGS. 5, 13, and 21.

At 2101, one or more SRBs are provided from storage class driver, such as storage class driver 1301. For purposes of clarity by way of example not limitation, it shall be assumed that a single SRB is processed, even though multiple SRBs may be processed at a time.

At 2102, such SRB is interrogated to determine whether it is for a write command. For purposes of clarity by way of example not limitation, it shall be assumed that a SCSI protocol is used, even though in other embodiments other protocols may be used. Thus, for example, at 2102 an SRB is interrogated to determine whether it is a SCSI write command. If at 2102 it is determined that such SRB is not a SCSI write command, then at 2103 it is determined whether such SRB is a SCSI read command. If it is determined at 2103 that such SRB is for a SCSI read command, then processing of such SCSI read command is described with reference to a read through a filter driver flow 2200 of FIG. 22. If, however, it is determined at 2103 that such SRB is not a SCSI read command, then at 2128 such SRB is provided to one or more lower-order filter ("lower-filter") drivers.

If, however, it is determined at 2102 that such SRB is for a SCSI write command, then at 2104 an envelope structure is allocated for such SRB. At 2105, such envelope is linked to such a SCSI write SRB allocated from memory mapped adapter DRAM. At 2106, such write SRB is enqueued, namely added to a queue. At 2107, output buffer pointers are initialized for each SRB, and a data pointer of such SRB obtained from class driver 1301 is passed as a data buffer pointer. At 2108, output buffers are allocated from memory mapped DRAM, such as DRAM 303. At 2109, MAC/digest buffers are allocated, and a MAC/digest pointer is initialized. At 2110, a share stride is initialized. In this example embodiment, a stride of eight shares is used; however, in other embodiments fewer or more than eight shares may be used.

At 2111, an encryption key ("encKey"), an encryption initialization vector ("encIV"), an information dispersal algorithm key ("idaKey"), a MAC mode, and MAC key, and a MAC initialization vector are initialized. At 2112, a parse data call for RPU 120 is composed with the envelope structure or envelop initialized or allocated at 2104. At 2113, a device driver function call is made by device driver 1309 to RPU 120 to perform data encryption and secure parsing operations on such data. As previously described elsewhere herein, such secure parsing operations may include parsing and splitting such data into any size data units. For example, parsing and splitting operations in accordance with a secure parser, as described elsewhere herein, may include, but are not limited to: 1) cryptographically split, disperse and securely store data shares in multiple locations; 2) encrypt, cryptographically split, disperse and securely store data shares in multiple locations; 3) encrypt, cryptographically split, encrypt each share, then disperse and securely store data shares in multiple locations; and 4) encrypt, cryptographically split, encrypt each share with a different type of encryption than was used in the first step, then disperse and securely store the data shares in multiple locations.

At 2115, device driver 1309 invokes an application programming interface ("API") at 2114 for communicating with RPU 120 for such secure parsing operations. At 2116, such secure parsing operations having been completed by RPU 120, device driver 1309 returns control to filter driver 1303. At 2117, filter driver 1303 receives an indication that RPU 120 as completed secure parsing operations and updates results from such secure parsing operations such envelope structure allocated at 2104.

At 2119, it is determined whether MAC authentication was successful. If at 2119 it is determined that MAC authentication was not successful, then filter driver flow 2100 provides an error status ("errors out") at 2118. If, however, it is determined that MAC authentication was successful at 2119, then at 2120 an SRB queue is searched for an envelope matching such envelope updated at 2117.

At 2121, it is determined whether an envelope obtained from such search at 2120 matches such envelope updated at 2117. If such envelopes do not match as determined at 2121, then such searching resumes at 2120 until a matching envelope is located. If, however, a matching envelope is located as determined at 2121, then at 2122 the matching envelope containing SRB is dequeued from such SRB queue searched at 2120.

At 2123, a command to compose a number of new SRBs respectively for each of the shares of securely parsed data is asserted. For purposes of clarity by way of example and not limitation, it shall be assumed that there are eight shares. However, in other embodiments, fewer or more than eight shares may be used.

At 2124, a new SRB is constructed for each share. For construction of an SRB for a share, a current SRB path identifier, namely a path identifier obtained from such SRB provided from storage class driver 1301, is set equal to a share ("new") SRB path identifier ("DrcSrb→PathId=SRB→PathId"), and a current SRB target identifier is set equal to a new SRB target identifier. Further, for this construction, a current SRB LUN is set equal to a new SRB LUN. Such newly constructed SRB's data buffer pointer is set equal to such envelope structure's output data buffer pointer indexed by share number (e.g., share number 1 of 8).

At 2125, it is determined whether a share number value or share number index has reached 8, namely is less than eight. If it is determined at 2125 that the share number is less than eight, then composition of another share SRB at 2123 is commenced for subsequent construction of another share SRB at 2124. If, however, it is determined at 2125 that a share number index is not less than eight, then at 2126 the 8 newly constructed share SRBs, are sent to one or more lower-filter drivers for receipt at 2128. In other embodiments, fewer or more than eight new SCSI write commands may be sent at 2126, as fewer or more share SRBs may be constructed. Furthermore, at 2126, DRAM memory 303 may be cleared or otherwise made available when such write commands have completed. In other words, such output buffers having such eight SRBs respectively stored may be indicated as being available for reuse.

Figure 22:
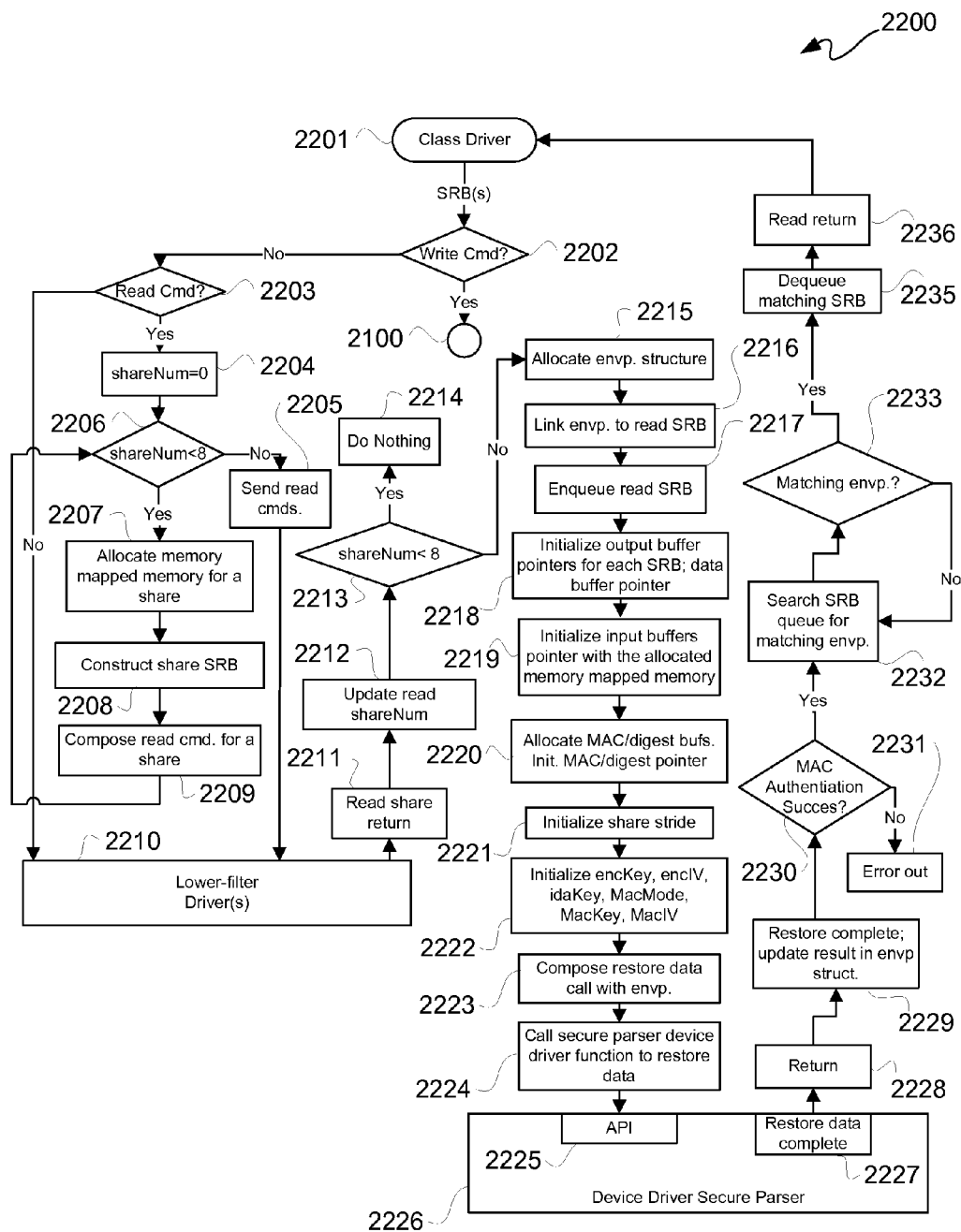
FIG. 22 is a flow diagram depicting an exemplary embodiment of a read through a filter driver flow.

FIG. 22 is a flow diagram depicting an exemplary embodiment of a read through a filter driver flow 2200. Filter driver flow 2200 may be for filter driver 1303 of FIG. 13. As filter driver 1303 communicates with class driver 1301 and device driver 1309, those drivers are mentioned in the following description of filter driver flow 2200. For purposes of clarity and not limitation, filter driver flow 2200 is described further with simultaneous reference to FIGS. 6, 13, and 21.

At 2201, one or more SRBs are provided from storage class driver, such as class driver 1301. For purposes of clarity by way of example not limitation, it shall be assumed that a single SRB is processed, even though multiple SRBs may be processed at a time.

At 2202, such SRB is interrogated to determine whether it is for a SCSI read command. For purposes of clarity by way of example not limitation, it shall be assumed that a SCSI protocol is used, even though in other embodiments other protocols may be used. Thus, for example, at 2202 an SRB is interrogated to determine whether it is for a SCSI write command. If such SRB is for a SCSI write command as determined at 2202, then such command is processed as previously described with reference to filter driver flow 2100. If, however, it is determined at 2202 that such SRB is not for a SCSI write command, then at 2203 it is determined whether such SRB is for a SCSI read command.

If at 2203 is determined that such SRB is not for a SCSI read command, then at 2210 such SRB is passed down to a next lower-filter driver. If, however, at 2203 it is determined that such SRB is for a SCSI read command, then a share number is initialized, such as equaling zero for example, at 2204.

At 2206, it is determined whether such share number is less than eight. Again, it should be understood that in other embodiments, such share number may be less or more than eight. If such share number is not less than eight as determined at 2206, then at 2205 eight new SCSI read commands are sent to a next lower-filter driver for receipt at 2210. In other embodiments, the number of new SCSI read commands sent at 2205 may be fewer or more than eight corresponding to the share number.

It should be understood that each share may be associated with any size data unit, and shares may be associated with any size data units, where such data units have been parsed and split from a single set of data into two or more portions or shares of data, as previously described elsewhere herein. If, however, at 2206 it is determined that the share number is less than eight, then at 2207 memory mapped DRAM 303 is allocated to a share indexed by share number.

At 2208, an SRB for such indexed share is constructed. For construction of an SRB for a share, a current SRB path identifier, namely a path identifier obtained from such SRB provided from storage class driver 1301, is set equal to an share ("new") SRB path identifier ("DrcSrb→PathId=SRB→PathId"), and a current SRB target identifier is set equal to a new SRB target identifier. Further, for this construction, a current SRB LUN is set equal to a new SRB LUN. Such newly constructed SRB is passed to a data buffer, where such data buffer is as an address space or portion of DRAM 303 allocated at 2207. In other words, a share has its own data buffer or buffer address space for storing its SRB as indexed by its share number (e.g., share number 1 of 8).

At 2209, a new SCSI read command is composed for a share. After such composition, it is determined again at 2206 whether or not the share number index is less than eight. This loop continues until it is determined at 2206 that the share number is not less than eight. In this example embodiment, this loop continues until eight share SRBs have been constructed. In other words, after completion of this loop there are eight share SRBs respectively indexed from 1 to 8, respectively allocated a data buffer, and each with an associated SCSI read command.

If at 2206 is determined that the share number is not less than eight, then at 2205 such at SCSI read commands composed as previously described are sent to a next lower-filter driver at 2010. At 2211, control of SCSI reads of such shares is returned to filter driver 1303 from such one or more lower-filter drivers. It should be appreciated that such one or more lower-filter drivers 2210 may be for one or more storage devices, as previously described herein.

At 2212, a SCSI read complete indexed to share number is updated by a share number for each of the shares read using one or more lower-filter drivers 2210. At 2213, it is determined whether such SCSI read complete index is less than eight. If at 2213, it is determined that such SCSI read complete index is less than eight, then at 2214 nothing is done, rather filter driver flow 2200 is in a wait state waiting for completion of the last of such SCSI reads.

If, however, at 2213 it is determined that the share number is not less than eight, then at 2215 an envelope structure for such read shares is allocated. At 2216, such envelope structure allocated at 2215 is linked to such read SRBs for each of such shares. At 2217, such read SRBs are enqueued. At 2218, output buffer pointers are initialized for each share SRB for passing as a data buffer pointer.

At 2219, pointers for input buffers are initialized for each share of allocated memory mapped DRAM 303 allocated at 2207. At 2220, MAC/digest buffers are allocated, and a MAC/digest pointer is initialized. At 2221, a share stride is initialized.

At 2222, an encryption key, an encryption IV, an ida key, a MAC mode, a MAC key, and a MAC IV are all initialized. At 2223, a restored data call for RPU 120 is composed with such initialized for allocated and share SRB linked envelope. At 2224, a function call to device driver 1309 is made by filter driver 1303 for a restore data function of RPU 120 with a parameter of an envelope structure pointer.

At 2226, device driver 1309 invokes an API at 2225 for communicating with a restorer of RPU 120 for restoring encrypted data to a single unencrypted set of data, such as for example unpacking share SRBs, by first recombining, then decrypting such data obtained therefrom. At 2227, such restoring application invoked at 2115 is completed by RPU 120, and RPU 120 provides a notice of completion to device driver 1309. Data that is restored by a restorer of RPU 120 may in some applications not be in an encrypted state from which it is restored. Accordingly, each portion of parsed data may be secured using any of a variety protocols provided, however, that such data may be reassembled, reconstituted, reformed, and/or decrypted to restored to its original or other usable form. Accordingly, restoring data may involve reversing any of a number of operations used to secure such data in accordance with the description herein.

At 2228, a return of control to filter driver 1303 from device driver 1309 is provided as a single data block is restored. At 2229, completion of such restoration by RPU 120 is recorded by updating a result in such an envelope structure links at 2216 to read share SRBs.

At 2230, it is determined whether MAC authentication was successful. If MAC authentication was not successful at 2230, then filter driver flow 2200 errors out at 2231. If, however, MAC authentication was successful at 2230, then at 2232 an SRB queue is search for and envelope matching such envelope updated at 2229. At 2233, it is determined whether an envelope obtained from such SRB queue at 2232 matches such envelope of 2229. If at 2233 it is determined that there is not a match between such envelopes, then searching continues at 2232. This loop continues until a match is found.

If, however, at 2233 it is determined that such envelopes match, then the matching envelope obtained from such SRB queue at 2232 is dequeued from such SRB queue at 2235. At 2236, SCSI read control is returned from filter driver 1303 to storage class driver 1301 at 2201.

Figure 23:
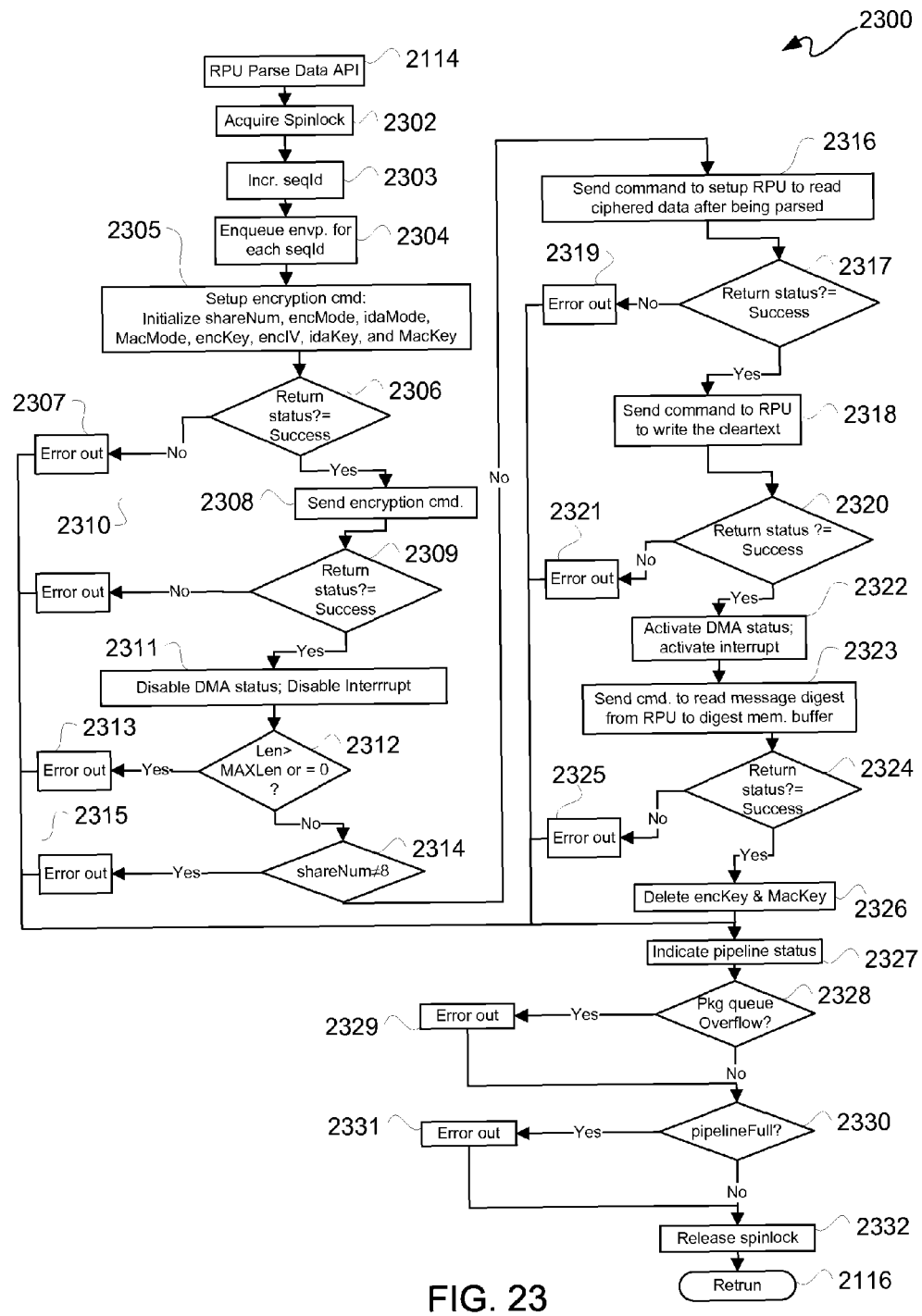
FIG. 23 is a flow diagram depicting an exemplary embodiment of a parse data through a device driver flow.

FIG. 23 is a flow diagram depicting an exemplary embodiment of a parse data through a device driver flow 2300. For purposes of clarity and not limitation, filter driver flow 2200 is described further with simultaneous reference to FIGS. 5, 13, and 21.

At 2114, an API for RPU 120 is invoked as previously described. At 2302, a spinlock is acquired. At 2303 a sequence identifier is incremented, such as incremented by one for example. Such sequence identifier may be incremented for each invocation of device driver flow 2300, and thus such sequence identifier may be used as a tag for subsequent reference. At 2304, an envelope is enqueued for a sequence identifier as incremented at 2303.

At 2305, an encryption command is set up. Such set up includes initialization of each of the following: a share number, an encryption mode, an ida mode, an MAC mode, an encryption key, an encryption IV, an ida key, and a MAC key.

At 2306, it is determined whether return status was successful. If return status failed as determined at 2306, then device driver flow errors out at 2307, and such error status is indicated as a pipeline status at 2327. At 2328, it is determined whether a package queue has overflowed. If it is determined that a package queue has overflowed at 2328, then an error out is asserted at 2329. If after either assertion of an error out at 2329 or a determination that a package queue has not overflowed at 2328, at 2330 is determined whether such a pipeline is full. If it is determined that such pipeline is full at 2330, then an error out is asserted at 2331. After either an error out is asserted at 2331 or it is determined that a pipeline is not full as determined at 2330, spinlock acquired at 2302 is released at 2332. At 2116, control is returned to filter driver 1303, as previously described.

If, however, it is determined at 2306 that return status was successful, then such encryption command set up at 2305 is sent at 2308. At 2309, it is determined whether return status was successful. If it is determined that 2309 that return status was not successful, then an error out is asserted at 2310 and processing continues as previously described starting from 2327.

If, however, it is determined at 2309 that return status was successful, then DMA status is disabled at 2311. Furthermore, at 2311, an interrupt is disabled. At 2312, it is determined whether data length is either greater than a maximum length allowed or equal to zero. If it is determined at 2312 that data length is either greater than a maximum length allowed or equal to zero, then an error out is asserted at 2313 and processing continues as previously described starting from 2327.

If, however, it is determined at 2312 that data length is neither greater than a maximum length allowed or equal to zero, then it is determined at 2314 whether a share number is not equal to eight. Again, the number of shares, such as for example the number of portions of data, in other embodiments may be less than or greater than eight. If at 2314 it is determined that the share number is not equal to eight, then at 2315 and error out status is asserted and processing continues as previously described starting from 2327.

If, however, at 2314 is determined that the share number does equal eight, then at 2316 a command to set up RPU 120 to read enciphered or encrypted data after such data has been parsed is sent. At 2317, it is determined whether return status was successful. If it is determined at 2317 that return status was not successful, then at 2320 an error out is asserted and processing continues as previously described starting from 2327.

If, however, at 2317 it is determined that return status was successful, then at 2318 a command is sent to RPU 120 to write data of read share SRBs by RPU 120 as cleartext. At 2320, it is determined whether return status was successful. If at 2320 it is determined that return status was not successful, then at 2321 an error out is asserted and processing continues as previously described starting from 2327.

If, however, at 2320 it is determined that return status was successful, then at 2322 DMA status indication is activated, and an interrupt generation is activated. At 2323, a command is sent to read a message digest of RPU 120 for writing to a digest memory buffer. Such digest memory buffer may be in system memory, such as system memory 116 for example, as may be associated with Message Signaled Interrupts ("MSI").

At 2324, it is determined whether return status was successful. If at 2324 it is determined that return status was not successful, an error out is asserted at 2325 and processing continues as previously described starting from 2327. If, however, it is determined at 2324 that return status was successful, the encryption and MAC keys set up at 2305 are deleted at 2326. After such deletion, processing continues as previously described starting from 2327.

Figure 24:
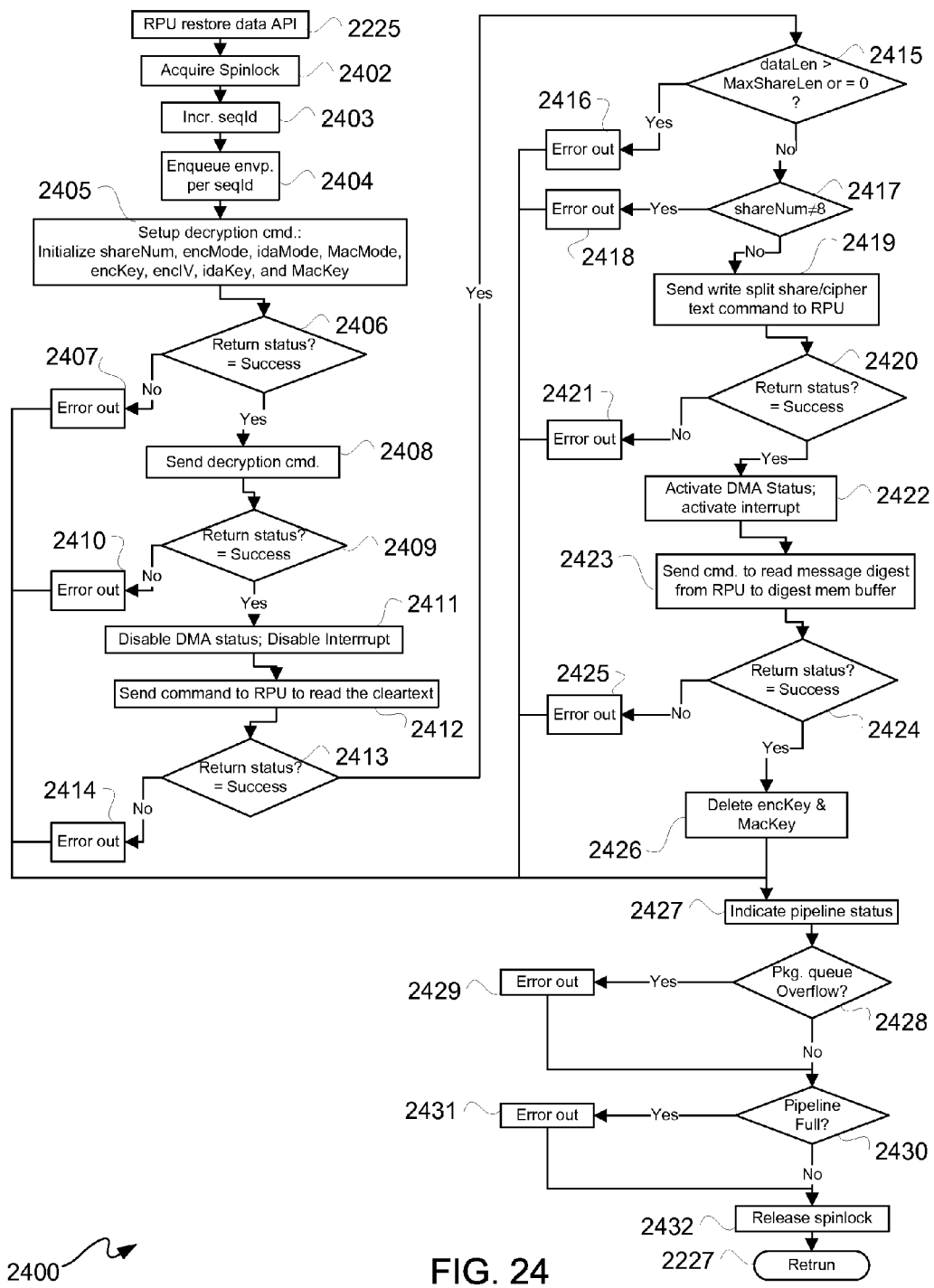
FIG. 24 is a flow diagram depicting an exemplary embodiment of a restore data through device driver flow.

FIG. 24 is a flow diagram depicting an exemplary embodiment of a restore data through device driver flow 2400. For purposes of clarity and not limitation, filter driver flow 2200 is described further with simultaneous reference to FIGS. 6, 13, and 21.

At 2225, device driver 1309 invokes a data restore API for RPU 120 as previously described. Operations 2402 through 2411 respectively correspond to operations 2302 through 2311 of FIG. 23, except that rather than sending an encryption command at 2308, a decryption command is sent at 2408. Accordingly, the remainder of the description of operations 2402 through 2411 is not repeated for purposes of clarity. After disabling DMA status and disabling an interrupt at 2411, at 2412 a command is sent to RPU 120 to read data, where such data is cleartext as having been decrypted at 2408.

At 2413, it is determined whether return status was successful. If at 2413 it is determined that return status was not successful, then an error out is asserted at 2414, and an indication of pipeline status is provided at 2427. As operations at 2427 through 2432 respectively correspond to operations 2327 through 2332 of FIG. 23, description of those operations is not repeated for purposes of clarity.

If, however, at 2413, it is determined that return status was successful, then at 2415 it is determined whether data length is either greater than a maximum share length allowed or equal to zero. As previously described with reference to FIG. 23, a maximum data length was for a single set of data to be parsed. A maximum share length is for each share, such as for example a maximum length of a subset of such single data block.

If at 2415 it is determined that data length is either greater than a maximum share length allowed or equal to zero, then an error out is asserted at 2416 and processing continues starting from 2427. If, however, at 2415 it is determined that data length is neither greater than a maximum share length allowed or equal to zero, then at 2417 is determined whether a share number does not equal eight. Operations at 2417 and 2418 respectively correspond to operations at 2314 and 2315 of FIG. 23, and thus description of those operations is not repeated for purposes of clarity.

If at 2417 it is determined that share number does equals eight, then at 2419 a command is sent to RPU 120 to write split or parsed shares as a single data block. At 2420 it is determined whether return status was successful. Operations 2420 through 2426 respectively correspond to operations 2320 through 2326 of FIG. 23, except that activating DMA status indication and activating an interrupt generation at 2422 is for DMA write operations for writing a single data block. In contrast, activating DMA status indication and activating an interrupt generation at 2322 of FIG. 23 was for DMA read operations for output of parsed encrypted shares to be written to storage devices, as described elsewhere herein. Additionally, it should be understood that keys deleted at 2426 were set up at 2405 for device driver flow 2400. The remainder of the description of operations 2420 through 2426 is not repeated for purposes of clarity.

Figure 25:
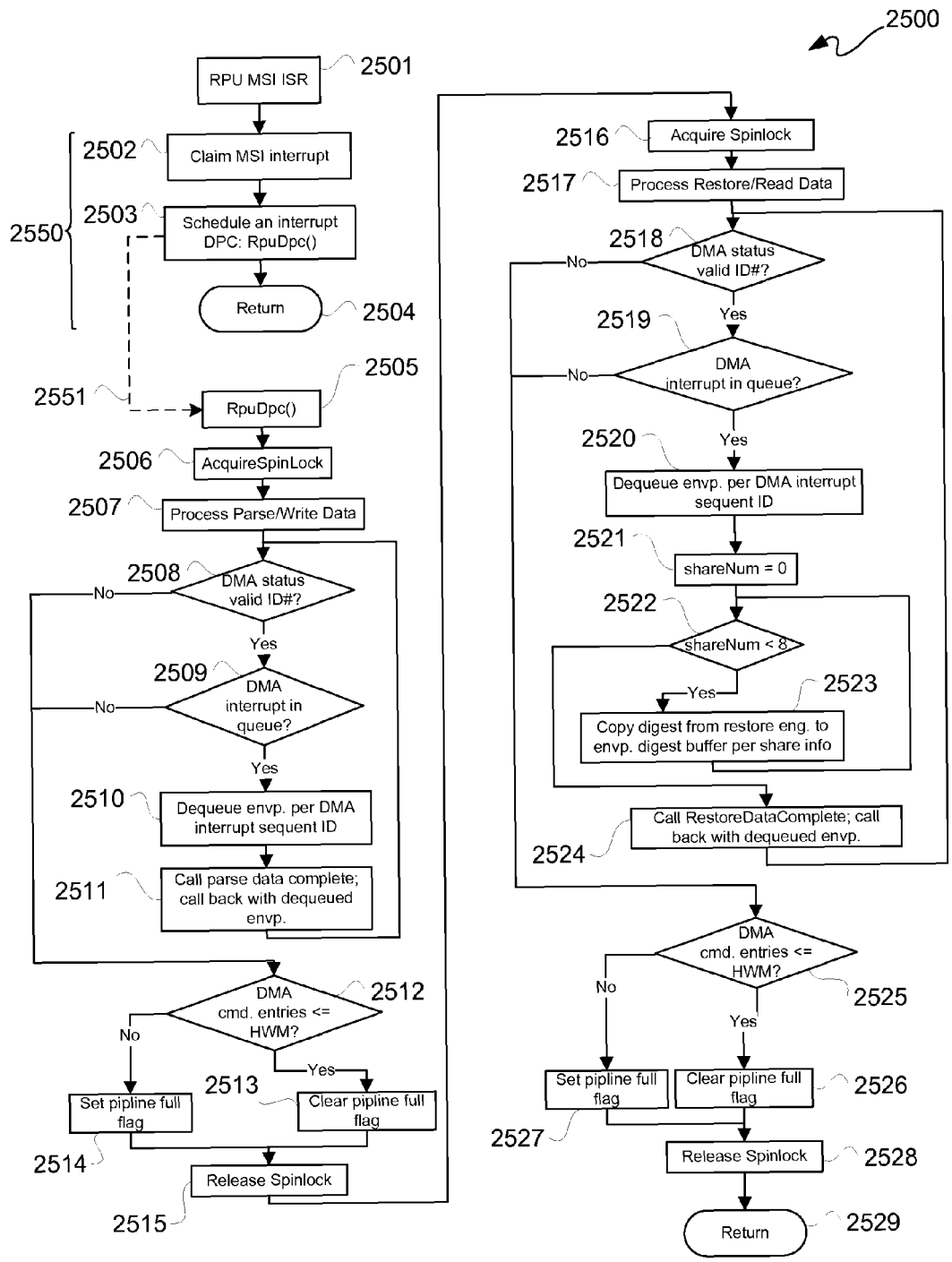
FIG. 25 is a flow diagram depicting an exemplary embodiment of a device driver interrupt service routine ("ISR") and deferred procedure call ("DPC") flow.

FIG. 25 is a flow diagram depicting an exemplary embodiment of a device driver interrupt service routine ("ISR") and deferred procedure call ("DPC") flow 2500. FIG. 25 is described with simultaneous reference to FIGS. 5, 6, 13, and 25.

At 2501, an MSI interrupt service routine for RPU 120 ("RpuMsilsr") is initiated. At 2502, an MSI interrupt is claimed. At 2503, an interrupt DPC is scheduled for RPU 120. Dashed line 2551 generally indicates initiation of such scheduled RPU DPC at 2505.

At 2504, control of an MSI-ISR portion 2550 of flow 2500 is returned to an OS. It should be understood that an MSI-ISR portion 2550 is at a significantly higher priority level than the remainder of flow 2500, namely a DPC portion. By separating MSI-ISR and DPC portions, control for such MSI-ISR portion can be returned to a host system OS as quickly, while allowing continuation of DPC portion to limit performance impact on such host system.

At 2505, a DPC for RPU 120 is initiated. At 2506, a spinlock is acquired. At 2507, data is processed for secure parsing thereof, and such processed data is written, as previously described elsewhere herein.

At 2508, it is determined whether DMA status has a valid identification and sequence number. In other words, although in this embodiment DMA processes only one transaction at a time, it is capable of queuing multiple DMA commands. This way DMA can process DMA transactions without gaps to reduce overhead. However, the number of multiple DMA commands queued is limited to a maximum number, and at 2508 it is determined whether such maximum number has been reached. If it is determined at 2508 that DMA status is valid, then at 2509 it is determined whether there is any DMA interrupt queued.

If it is determined at 2509 that there is any DMA interrupt queued, then at 2510 each envelope for each DMA interrupt sequence identifier is dequeued. At 2511, a function call is made for secure parsed data completion with a call back with each envelope dequeued at 2510. From 2511, it is again determined at 2508 whether DMA status is valid.

If at it is determined either that DMA status is not valid at 2508 or that there is no DMA interrupt in a queue at 2509, then at 2512 it is determined whether DMA command entries are less than or equal to a maximum number of commands (e.g., a "high water mark"). If at 2512 it is determined that DMA command entries are less than or equal to such high water mark, then at 2513 a pipeline is full flag is cleared or left in a clear state. If, however, at 2512 it is determined that DMA command entries are greater than such a high water mark, then at 2514 such pipeline full flag is set or left in a set state.

After setting or clearing such pipeline full flag as previously described at 2514 and 2513, respectively, at 2515 the spinlock acquired at 2506 is released. At 2516, another spinlock is acquired. It should be understood that the spinlock acquired at 2506 is for a data parsing and encrypting portion; however, the spinlock acquired at 2516 is for a data decrypting restore portion.

At 2517, a command to read and restore securely parsed data is initiated. Operations at 2518 through 2520 correspond to operations at 2508 through 2510, and thus repetition of such description is avoided for purposes of clarity.

After dequeuing at 2520, at 2521 a share number index is initialized, such as set to zero for example. At 2522, it is determined whether such share number index is less than eight. Again, it should be understood that a share number less than or greater than eight may be used in other embodiments.

At 2523, a digest from a restore engine of RPU 120 is copied to an envelope digest buffer for storing therein information on a share. After copying at 2523, it is again determined at 2522 whether a share number index is less than eight. Accordingly, this loop continues until a digest from restore engine of RPU is copied to an envelope digest buffer for storing therein information on each of the shares read.

If at 2522, it is determined that a share number index is not less than eight, then at 2524 a function call is made to indicate completion of read data having been restored. Such function call may include a call back with a dequeued envelope. From 2524, it is determined again whether DMA status is valid at 2518.

If it is determined that either DMA status is invalid at 2518 or no DMA interrupt is in a queue at 2519, then it is determined whether DMA command entries are less than or equal to a high water mark at 2525. Operations 2525 through 2528 respectively correspond to operations 2512 through 2515, and thus description of operations 2525 through 2528 is not repeated for purposes of clarity. After the spinlock acquired at 2516 is released at 2528, flow 2500 may return at 2529, such as for example to a host system OS from which it was called.

Figure 26:
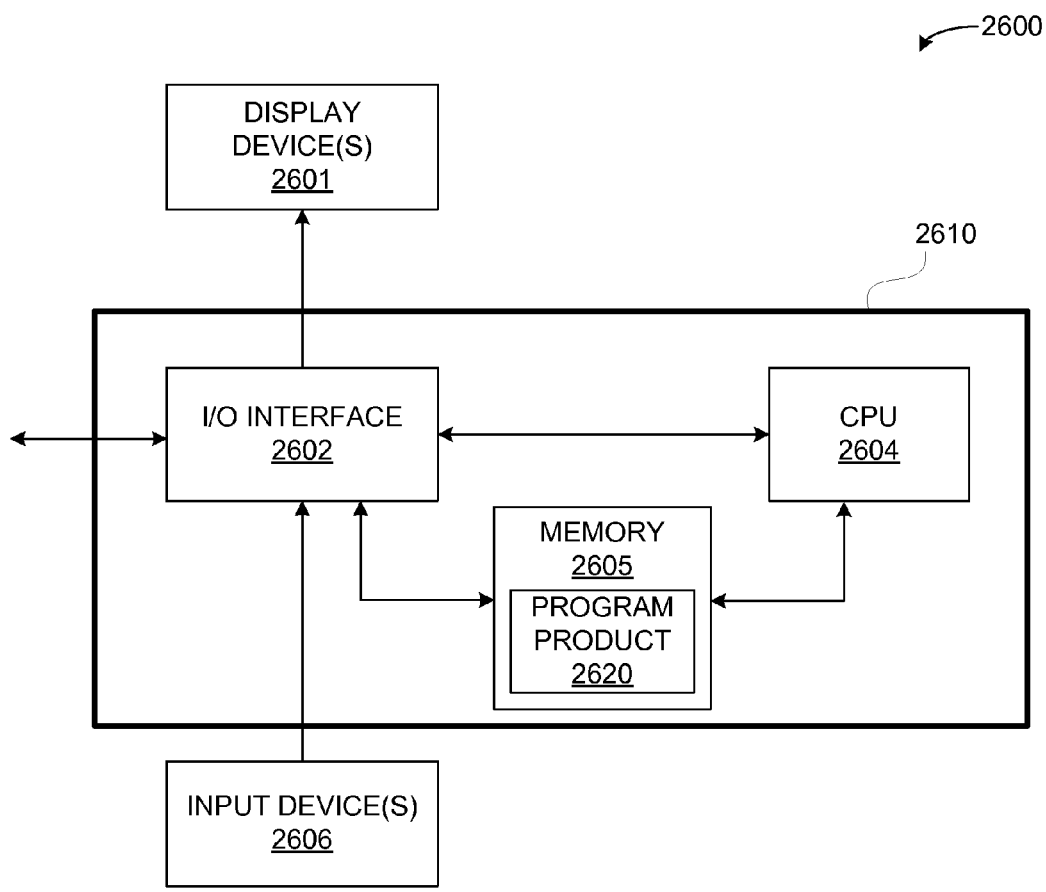
FIG. 26 is a block diagram depicting an exemplary embodiment of a computer system.

FIG. 26 is a block diagram depicting an exemplary embodiment of a computer system 2600. Computer system 2600 may include a programmed computer 2610 coupled to one or more display devices 2601, such as Cathode Ray Tube ("CRT") displays, plasma displays, Liquid Crystal Displays ("LCD"), projectors and to one or more input devices 2606, such as a keyboard and a cursor pointing device. Other known configurations of a computer system may be used.

Programmed computer 2610 may be programmed with a known operating system, which may be Mac OS, Java Virtual Machine, Linux, Solaris, Unix, or a Windows operating system, among other known platforms. Programmed computer 2610 includes a central processing unit ("CPU") 2604, memory 2605, and an input/output ("I/O") interface 2602. CPU 2604 may be a type of microprocessor known in the art, such as available from IBM, Intel, ARM, and Advanced Micro Devices for example. Support circuits (not shown) may include cache, power supplies, clock circuits, data registers, and the like. Memory 2605 may be directly coupled to CPU 2604 or coupled through I/O interface 2602. At least a portion of an operating system may be disposed in memory 2605. Memory 2605 may include one or more of the following: random access memory, read only memory, magneto-resistive read/write memory, optical read/write memory, cache memory, magnetic read/write memory, and the like, as well as non-transitory signal-bearing media as described below.

I/O interface 2602 may include chip set chips, graphics processors, and daughter cards, among other known circuits. An example of a daughter card may include a network interface card, a display interface card, a modem card, and/or a Universal Serial Bus ("USB") interface card. Furthermore, I/O interface 2602 may include a daughter card 101 or 201, as described herein.

I/O interface 2602 may be coupled to a conventional keyboard, network, mouse, display printer, and interface circuitry adapted to receive and transmit data, such as data files and the like. Programmed computer 2610 may be a server computer or a workstation computer. Thus, computer 2610 may be coupled to a number of client computers, server computers, or any combination thereof via a conventional network infrastructure, such as a company's Intranet and/or the Internet, for example, allowing distributed use for interface generation.

Memory 2605 may store all or portions of one or more programs or data to implement processes in a non-transitory machine-readable medium in accordance with one or more embodiments hereof to provide any one or more of filter driver 1303, device driver 1309, lower filter driver 1605, RAM disk device driver 1608, secure parser 1609, filter driver 1704, device driver 1705, NIC filter driver 2011, storage filter driver 2012, secure parser 2021, secure parser 2023, filter driver flow 2100, filter driver flow 2200, device driver flow 2300, device driver flow 2400, and/or ISR-DPC flow 2500 as program product 2620. Additionally, those skilled in the art will appreciate that one or more embodiments hereof may be implemented in hardware, software, or a combination of hardware and software. Such implementations may include a number of processors or processor cores independently executing various programs and dedicated hardware or programmable hardware.

One or more program(s) of program product 2620, as well as documents thereof, may define functions of embodiments hereof and can be contained on a variety of non-transitory signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or hard-disk drive or read/writable CD or read/writable DVD). The above embodiments specifically include information downloaded from the Internet and other networks. Such non-transitory signal-bearing media, when carrying computer-readable instructions that direct functions hereof, represent embodiments hereof.

While the foregoing describes exemplary embodiment(s) in accordance with one or more embodiments, other and further embodiment(s) in accordance with the one or more embodiments may be devised without departing from the scope thereof, which is determined by the claim(s) that follow and equivalents thereof. Claim(s) listing steps do not imply any order of the steps. Trademarks are the property of their respective owners.

What is claimed is:

1. A kernel-mode driver architecture, comprising:
    a processor for execution of a filter driver, a device driver and a port driver in a kernel mode;

the filter driver configured to receive a request;
wherein the request includes a write command and payload or a read command;
wherein the filter driver is configured to generate write commands responsive to the write command and read commands responsive to the read command;
wherein the filter driver provides for separation of command information from data for taking separate processing paths;
a device driver configured to receive the write commands and the payload or the read commands from the filter driver to provide to a peripheral interface; and
a port driver configured to receive the write commands or the read commands from the filter driver to provide to the peripheral interface.

2. The kernel-mode driver architecture according to claim 1, further comprising:
a class driver for execution by the processor in the kernel mode, the class driver configured to receive a request packet and to provide the request as a request block to the filter driver in response to the request packet.

3. The kernel-mode driver architecture according to claim 2, wherein the port driver includes:
a software stack to receive the write commands or the read commands; and
a communications driver to receive the write commands or the read commands from the software stack for providing to the peripheral interface.

4. The kernel-mode driver architecture according to claim 3, wherein:
the request packet is an Input/Output Request Packet ("IRP");
the request block is a Small Computer System Interface ("SCSI") Request Block ("SRB"); and
the communications driver is a miniport driver for a network interface coupled to the peripheral interface.

5. A driver stack for the kernel-mode driver architecture according to claim 4, comprising:
a user application for providing the request packet, the user application including:
a network application for transfer of first information over a network using the network interface;
a user request for file input/output ("I/O") application for transfer of second information to a storage media using the network interface;
an Internet SCSI ("iSCSI") initiator configuration application to select the storage media to use and to initiate a transfer of the second information using an iSCSI storage protocol, and
a reconfigurable processor unit ("RPU") administrative configuration application for setting up and initializing the filter driver, the device driver, and an RPU.

6. The driver stack according to claim 5, wherein the device driver is a Windows Driver Model ("WDM") driver for the RPU.

7. A computer system, comprising:
a general-purpose processor for execution of a user application in an application mode and kernel-mode drivers in a kernel mode;
an accelerator system coupled to the general-purposes processor via a first bus;
wherein the kernel-mode drivers include a class driver, a filter driver, a device driver, a stack driver, and a port driver;
the class driver in communication with the user application to receive a request packet to provide a request block in response to the request packet;
the filter driver in communication with the class driver to receive the request block;
wherein the request block includes a command and a system payload pointer;
wherein the filter driver generates first commands and second commands responsive to the command;
wherein each of the first commands and the second commands include a same set of local payload pointers generated by the filter driver;
the device driver in communication with the filter driver to receive the system payload pointer and the first commands; and
the device driver in communication with the accelerator system to provide the first commands and the payload pointer thereto.

8. The computer system according to claim 7, wherein:
the stack driver is in communication with the filter driver to receive the second commands;
the port driver is in communication with the stack driver to receive the second commands; and
the accelerator system is in communication with the port driver to receive the second commands.

9. The computer system according to claim 8, wherein:
the command is a write command or a read command; and
the system payload pointer points to a first location of a data unit stored in system memory.

10. The computer system according to claim 9, wherein for the write command:
a configured Programmable Logic Device of the accelerator system is to retrieve the data unit from the system memory using the system payload pointer, process the data unit retrieved responsive to the first commands to provide data units, and store the data units in local memory of the accelerator system at locations pointed to by the local payload pointers of the first commands;
wherein the data unit is split into the data units by the configured Programmable Logic Device.

11. The computer system according to claim 10, wherein:
the port driver is in communication with a network interface of the accelerator system;
the network interface is coupled to the local memory of the accelerator system; and
the network interface is to retrieve the data units from the local memory using the local payload pointers of the second commands and to transmit the data units for storage in storage devices coupled to a network.

12. The computer system according to claim 11, wherein for the read command:
the network interface responsive to the second commands is to retrieve the data units from the storage devices, store the data units retrieved in the local memory at the locations pointed to by the local payload pointers of the second commands; and
the configured Programmable Logic Device is to retrieve the data units from the local memory at the locations pointed to by the local payload pointers of the first commands, and reverse process the data units retrieved responsive to the first commands to provide the data unit.

13. The computer system according to claim 10, wherein:
the port driver is in communication with a storage device of the accelerator system;
the storage device is coupled to the local memory of the accelerator system;

the storage device is to retrieve the data units from the local memory using the local payload pointers of the second commands and to store the data units in the storage device.

14. The computer system according to claim 13, wherein for the read command:
the storage device responsive to the second commands is to retrieve the data units from the storage device, store the data units retrieved in the local memory at the locations pointed to by the local payload pointers of the second commands; and
the configured Programmable Logic Device is to retrieve the data units from the local memory at the locations pointed to by the local payload pointers of the first commands, and reverse process the data units retrieved responsive to the first commands to provide the data unit.

15. A method for a kernel-mode driver, comprising:
executing a filter driver, a device driver and a port driver in a kernel mode by a processor;
obtaining a request by the filter driver;
wherein the request includes a write command and payload or a read command;
generating by the filter driver write commands responsive to the write command or read commands responsive to the read command;
receiving by the device driver the write commands and the payload or the read commands from the filter driver to provide to a peripheral interface; and
receiving by the port driver the write commands or the read commands from the filter driver to provide to the peripheral interface.

16. The method according to claim 15, further comprising:
executing the class driver in the kernel mode by the processor; and
receiving to the class driver a request packet and providing the request as a request block to the filter driver in response to the request packet.

17. The method according to claim 16, wherein the port driver includes:
a software stack to receive the write commands or the read commands; and
a communications driver to receive the write commands or the read commands from the software stack for providing to the peripheral interface.

18. The kernel-mode driver architecture according to claim 17, wherein:
the request packet is an Input/Output Request Packet ("IRP");
the request block is a Small Computer System Interface ("SCSI") Request Block ("SRB"); and
the communications driver is a miniport driver for a network interface coupled to the peripheral interface.

19. The method according to claim 18, wherein the request packet is provided from a user application.

20. A non-transitory machine-readable medium having stored thereof information representing instructions that, when executed by a processor, cause the processor to perform operations comprising:
providing a request to a filter driver;
wherein the request includes a write command and payload or a read command;
generating, by the filter driver, write commands responsive to the write command or read commands responsive to the read command;
receiving, by a device driver, the write commands and the payload or the read commands from the filter driver to provide to a peripheral interface; and
receiving, by a port driver, the write commands or the read commands from the filter driver to provide to the peripheral interface.

* * * * *